US010891485B2

(12) United States Patent
Anorga et al.

(10) Patent No.: US 10,891,485 B2
(45) Date of Patent: Jan. 12, 2021

(54) IMAGE ARCHIVAL BASED ON IMAGE CATEGORIES

(71) Applicant: Google LLC, Mountain View, CA (US)

(72) Inventors: Juan Carlos Anorga, San Francisco, CA (US); David Lieb, San Francisco, CA (US); Madhur Khandelwal, Sunnyvale, CA (US); Evan Millar, Pleasanton, CA (US); Timothy Novikoff, Mountain View, CA (US); Mugdha Kulkarni, Fremont, CA (US); Leslie Ikemoto, Mountain View, CA (US); Jorge Verdu, Mountain View, CA (US); Jingyu Cui, Milpitas, CA (US); Sharadh Ramaswamy, Sunnyvale, CA (US); Raja Ratna Murthy Ayyagari, Sunnyvale, CA (US); Marc Cannon, San Francisco, CA (US); Alexander Roe, Mountain View, CA (US); Shaun Tungseth, Millbrae, CA (US); Songbo Jin, Mountain View, CA (US); Matthew Bridges, New Providence, NJ (US); Ruirui Jiang, Mountain View, CA (US); Jeremy Selier, Mountain View, CA (US); Austin Suszek, San Francisco, CA (US); Gang Song, Foster City, CA (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 15/912,809

(22) Filed: Mar. 6, 2018

(65) Prior Publication Data
US 2018/0336226 A1    Nov. 22, 2018

Related U.S. Application Data

(60) Provisional application No. 62/507,048, filed on May 16, 2017.

(51) Int. Cl.
*G06K 9/00* (2006.01)
*G06K 9/62* (2006.01)
(Continued)

(52) U.S. Cl.
CPC ......... *G06K 9/00671* (2013.01); *G06F 3/048* (2013.01); *G06F 16/50* (2019.01);
(Continued)

(58) Field of Classification Search
CPC ... G06F 16/583; G06F 3/048; G06K 9/00442; G06K 9/00456; G06K 9/00671; G06K 9/6267; G06K 9/00677
See application file for complete search history.

(56) References Cited

U.S. PATENT DOCUMENTS 6,092,102 A    7/2000   Wagner
6,883,140 B1   4/2005   Acker et al.
(Continued)

FOREIGN PATENT DOCUMENTS

CN    1475908       2/2004
CN    102222079     10/2011
(Continued)

OTHER PUBLICATIONS

EPO, Communication Pursuant to Article 94(3) EPC for European Patent Application No. 16825663.4, dated Apr. 16, 2019, 5 pages.
(Continued)

*Primary Examiner* — Kenny A Cese
(74) *Attorney, Agent, or Firm* — IP Spring

(57) ABSTRACT

Implementations relate to removal of one or more images from a view of a plurality of images. In some implementations, a method includes obtaining a plurality of images, programmatically analyzing the plurality of images to determine a plurality of image features, and determining one or more image categories for the plurality of images based on
(Continued)

the image features. The method further includes identifying a subset of the plurality of images based on the image categories, wherein each image of the subset is associated with an image category for archival. The method further includes causing a user interface to be displayed that includes one or more images of the subset, receiving user input to archive at least one of the one or more images, and in response to the user input, removing the at least one of the images from a view of the plurality of images.

20 Claims, 12 Drawing Sheets

(51) Int. Cl.
*G06N 20/00* (2019.01)
*G06F 16/51* (2019.01)
*G06F 16/58* (2019.01)
*G06N 3/04* (2006.01)
*G06F 16/583* (2019.01)
*G06F 3/048* (2013.01)
*G06F 16/50* (2019.01)
*G06F 16/54* (2019.01)
*G06N 7/00* (2006.01)
*G06N 20/10* (2019.01)
*G06K 9/78* (2006.01)

(52) U.S. Cl.
CPC .......... *G06F 16/51* (2019.01); *G06F 16/5838* (2019.01); *G06K 9/00442* (2013.01); *G06K 9/00456* (2013.01); *G06K 9/00677* (2013.01); *G06K 9/00684* (2013.01); *G06K 9/6267* (2013.01); *G06N 3/0445* (2013.01); *G06N 3/0454* (2013.01); *G06N 20/00* (2019.01); *G06F 16/54* (2019.01); *G06F 16/583* (2019.01); *G06K 9/78* (2013.01); *G06N 7/005* (2013.01); *G06N 20/10* (2019.01)

(56) References Cited

U.S. PATENT DOCUMENTS

| | | | |
|---|---|---|---|
| 7,603,413 B1 | 10/2009 | Herold et al. |
| 8,266,109 B1 | 9/2012 | Bilsborough |
| 8,391,618 B1 | 3/2013 | Chuang et al. |
| 8,423,577 B1 | 4/2013 | Lee et al. |
| 8,515,958 B2 | 8/2013 | Knight |
| 8,554,701 B1 | 10/2013 | Dillard et al. |
| 8,589,407 B2 | 11/2013 | Bhatia |
| 8,650,210 B1 | 2/2014 | Cheng et al. |
| 8,688,698 B1 | 4/2014 | Black et al. |
| 8,700,480 B1 | 4/2014 | Fox et al. |
| 8,825,474 B1 | 9/2014 | Zhai et al. |
| 8,938,669 B1 | 1/2015 | Cohen |
| 8,996,639 B1 | 3/2015 | Faaborg et al. |
| 9,020,956 B1 | 4/2015 | Barr et al. |
| 9,191,786 B2 | 11/2015 | Davis |
| 9,213,941 B2 | 12/2015 | Petersen |
| 9,230,241 B1 | 1/2016 | Singh et al. |
| 9,262,517 B2 | 2/2016 | Feng et al. |
| 9,330,110 B2 | 5/2016 | Lin et al. |
| 9,560,152 B1 | 1/2017 | Jamdar et al. |
| 9,600,724 B2 | 3/2017 | Ko et al. |
| 9,674,120 B2 | 6/2017 | Davis |
| 9,715,496 B1 | 7/2017 | Sapoznik et al. |
| 9,805,371 B1 | 10/2017 | Sapoznik et al. |
| 9,807,037 B1 | 10/2017 | Sapoznik et al. |
| 9,817,813 B2 | 11/2017 | Faizakof et al. |
| 9,973,705 B2 | 5/2018 | Ko et al. |
| 10,129,193 B2 | 11/2018 | Mahmoud et al. |
| 10,146,748 B1 | 12/2018 | Barndollar et al. |
| 10,146,768 B2 | 12/2018 | Fuxman et al. |
| 10,404,636 B2 | 9/2019 | Rodriguez et al. |
| 10,412,030 B2 | 9/2019 | McGregor et al. |
| 10,440,279 B2 | 10/2019 | Ko et al. |
| 10,547,574 B2 | 1/2020 | Pham |
| 2003/0105589 A1 | 6/2003 | Liu et al. |
| 2003/0182374 A1 | 9/2003 | Haldar |
| 2005/0146621 A1 | 7/2005 | Tanaka et al. |
| 2006/0004685 A1* | 1/2006 | Pyhalammi ............. G06F 16/54 |
| 2006/0029106 A1 | 2/2006 | Ott et al. |
| 2006/0150119 A1 | 7/2006 | Chesnais et al. |
| 2006/0156209 A1 | 7/2006 | Matsuura et al. |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2007/0244980 A1 | 10/2007 | Baker et al. |
| 2008/0120371 A1 | 5/2008 | Gopal |
| 2009/0007019 A1 | 1/2009 | Kobayashi et al. |
| 2009/0076795 A1 | 3/2009 | Bangalore et al. |
| 2009/0119584 A1 | 5/2009 | Herbst |
| 2009/0282114 A1 | 11/2009 | Feng et al. |
| 2009/0313194 A1 | 12/2009 | Amar et al. |
| 2010/0118115 A1 | 5/2010 | Takahashi et al. |
| 2010/0228590 A1 | 9/2010 | Muller et al. |
| 2010/0260426 A1 | 10/2010 | Huang et al. |
| 2011/0074685 A1 | 3/2011 | Causey et al. |
| 2011/0091092 A1 | 4/2011 | Nepomniachtchi et al. |
| 2011/0098056 A1 | 4/2011 | Rhoads |
| 2011/0107223 A1 | 5/2011 | Tilton et al. |
| 2011/0145068 A1 | 6/2011 | King et al. |
| 2011/0164163 A1 | 7/2011 | Bilbrey et al. |
| 2011/0212717 A1 | 9/2011 | Rhoads et al. |
| 2011/0221912 A1 | 9/2011 | Yoshizawa |
| 2011/0230174 A1 | 9/2011 | Mandanapu et al. |
| 2011/0252108 A1 | 10/2011 | Morris et al. |
| 2011/0252207 A1 | 10/2011 | Janosik, Jr. et al. |
| 2012/0030289 A1 | 2/2012 | Buford et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lau et al. |
| 2012/0131520 A1 | 5/2012 | Tang et al. |
| 2012/0179717 A1 | 7/2012 | Kennedy et al. |
| 2012/0224743 A1 | 9/2012 | Rodriguez et al. |
| 2012/0245944 A1 | 9/2012 | Gruber et al. |
| 2012/0278164 A1 | 11/2012 | Spivack et al. |
| 2012/0322428 A1 | 12/2012 | Lupoli et al. |
| 2013/0022231 A1 | 1/2013 | Nepomniachtchi et al. |
| 2013/0050507 A1 | 2/2013 | Syed et al. |
| 2013/0061148 A1 | 3/2013 | Das et al. |
| 2013/0073366 A1 | 3/2013 | Heath |
| 2013/0260727 A1 | 10/2013 | Knudson et al. |
| 2013/0262574 A1 | 10/2013 | Cohen |
| 2013/0346235 A1 | 12/2013 | Lam |
| 2014/0004889 A1 | 1/2014 | Davis |
| 2014/0035846 A1 | 2/2014 | Lee et al. |
| 2014/0047413 A1 | 2/2014 | Sheive et al. |
| 2014/0067371 A1 | 3/2014 | Liensberger |
| 2014/0088954 A1 | 3/2014 | Shirzadi et al. |
| 2014/0108562 A1 | 4/2014 | Panzer |
| 2014/0129942 A1 | 5/2014 | Rathod |
| 2014/0163954 A1 | 6/2014 | Joshi et al. |
| 2014/0164506 A1 | 6/2014 | Tesch et al. |
| 2014/0171133 A1 | 6/2014 | Stuttle et al. |
| 2014/0189027 A1 | 7/2014 | Zhang et al. |
| 2014/0189538 A1 | 7/2014 | Martens et al. |
| 2014/0201675 A1 | 7/2014 | Joo et al. |
| 2014/0228009 A1 | 8/2014 | Chen et al. |
| 2014/0232889 A1 | 8/2014 | King et al. |
| 2014/0237057 A1 | 8/2014 | Khodorenko |
| 2014/0317030 A1 | 10/2014 | Shen et al. |
| 2014/0337438 A1 | 11/2014 | Govande et al. |
| 2014/0341476 A1 | 11/2014 | Kulick et al. |
| 2014/0372349 A1 | 12/2014 | Driscoll |
| 2014/0372540 A1 | 12/2014 | Libin |
| 2015/0006143 A1 | 1/2015 | Skiba et al. |
| 2015/0026101 A1 | 1/2015 | Lin et al. |
| 2015/0026642 A1 | 1/2015 | Wilson et al. |
| 2015/0032724 A1 | 1/2015 | Thirugnanasundaram et al. |
| 2015/0058720 A1 | 2/2015 | Smadja et al. |

(56) References Cited

U.S. PATENT DOCUMENTS

| | | |
|---|---|---|
| 2015/0095855 A1 | 4/2015 | Bai et al. |
| 2015/0100537 A1 | 4/2015 | Grieves et al. |
| 2015/0171133 A1 | 6/2015 | Kim et al. |
| 2015/0178371 A1 | 6/2015 | Seth et al. |
| 2015/0178388 A1 | 6/2015 | Winnemoeller et al. |
| 2015/0185995 A1 | 7/2015 | Showmaker et al. |
| 2015/0207765 A1 | 7/2015 | Brantingham et al. |
| 2015/0220806 A1* | 8/2015 | Heller .................. G06F 16/583 382/159 |
| 2015/0227797 A1 | 8/2015 | Ko et al. |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1 | 10/2015 | Petersen |
| 2015/0347617 A1 | 12/2015 | Weinig et al. |
| 2015/0370830 A1* | 12/2015 | Murphy-Chutorian ..................... G06F 16/5838 707/748 |
| 2016/0011725 A1 | 1/2016 | D'Argenio et al. |
| 2016/0037311 A1 | 2/2016 | Cho |
| 2016/0042252 A1 | 2/2016 | Sawhney et al. |
| 2016/0043817 A1 | 2/2016 | Handoush et al. |
| 2016/0043974 A1 | 2/2016 | Purcell et al. |
| 2016/0055246 A1 | 2/2016 | Marcin et al. |
| 2016/0072737 A1 | 3/2016 | Forster |
| 2016/0092044 A1 | 3/2016 | Laska et al. |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0196040 A1 | 7/2016 | Kapadia et al. |
| 2016/0210279 A1 | 7/2016 | Kim et al. |
| 2016/0224524 A1 | 8/2016 | Kay et al. |
| 2016/0226804 A1 | 8/2016 | Hampson et al. |
| 2016/0234553 A1 | 8/2016 | Hampson et al. |
| 2016/0283454 A1 | 9/2016 | Leydon et al. |
| 2016/0321052 A1 | 11/2016 | Sharifi et al. |
| 2016/0342895 A1 | 11/2016 | Gao et al. |
| 2016/0350304 A1 | 12/2016 | Aggarwal et al. |
| 2016/0378080 A1 | 12/2016 | Uppala et al. |
| 2017/0017648 A1* | 1/2017 | Pearlman .................. G06K 9/46 |
| 2017/0031575 A1 | 2/2017 | Dotan-Cohen et al. |
| 2017/0075878 A1 | 3/2017 | Jon et al. |
| 2017/0093769 A1 | 3/2017 | Lind et al. |
| 2017/0098122 A1 | 4/2017 | el Kaliouby et al. |
| 2017/0134316 A1 | 5/2017 | Cohen et al. |
| 2017/0142046 A1 | 5/2017 | Mahmoud et al. |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0187654 A1 | 6/2017 | Lee |
| 2017/0250930 A1 | 8/2017 | Ben-Itzhak |
| 2017/0250935 A1 | 8/2017 | Rosenberg |
| 2017/0250936 A1 | 8/2017 | Rosenberg et al. |
| 2017/0293834 A1 | 10/2017 | Raison et al. |
| 2017/0308589 A1 | 10/2017 | Liu et al. |
| 2017/0324868 A1 | 11/2017 | Tamblyn et al. |
| 2017/0344224 A1 | 11/2017 | Kay et al. |
| 2017/0357432 A1 | 12/2017 | King et al. |
| 2017/0357442 A1 | 12/2017 | Peterson et al. |
| 2017/0359279 A1 | 12/2017 | Peterson et al. |
| 2017/0359281 A1 | 12/2017 | Yip et al. |
| 2017/0359282 A1 | 12/2017 | Alsina et al. |
| 2017/0359283 A1 | 12/2017 | Bernstein |
| 2017/0359285 A1 | 12/2017 | Weinig et al. |
| 2017/0359701 A1 | 12/2017 | Sarma et al. |
| 2017/0359702 A1 | 12/2017 | Peterson et al. |
| 2017/0359703 A1 | 12/2017 | Ciechanowski et al. |
| 2018/0004397 A1 | 1/2018 | Mazzocchi |
| 2018/0005272 A1 | 1/2018 | Todasco et al. |
| 2018/0012231 A1 | 1/2018 | Sapoznik et al. |
| 2018/0013699 A1 | 1/2018 | Sapoznik et al. |
| 2018/0032499 A1 | 2/2018 | Hampson et al. |
| 2018/0032997 A1 | 2/2018 | Gordon et al. |
| 2018/0060705 A1 | 3/2018 | Mahmoud et al. |
| 2018/0083894 A1 | 3/2018 | Fung et al. |
| 2018/0083898 A1 | 3/2018 | Pham |
| 2018/0083901 A1 | 3/2018 | McGregor et al. |
| 2018/0090135 A1 | 3/2018 | Schlesinger et al. |
| 2018/0109526 A1 | 4/2018 | Fung et al. |
| 2018/0137097 A1 | 5/2018 | Lim et al. |
| 2018/0196854 A1 | 7/2018 | Burks |
| 2018/0210874 A1 | 7/2018 | Fuxman et al. |
| 2018/0227498 A1 | 8/2018 | Ko et al. |
| 2018/0293601 A1 | 10/2018 | Glazier |
| 2018/0309706 A1 | 10/2018 | Kim et al. |
| 2018/0316637 A1 | 11/2018 | Desjardins |
| 2018/0322403 A1 | 11/2018 | Ron et al. |
| 2018/0336415 A1 | 11/2018 | Anorga et al. |
| 2018/0352393 A1 | 12/2018 | Lottermoser et al. |
| 2018/0367483 A1 | 12/2018 | Rodriguez et al. |
| 2018/0367484 A1 | 12/2018 | Rodriguez et al. |
| 2018/0373683 A1 | 12/2018 | Hullette et al. |

FOREIGN PATENT DOCUMENTS

| | | |
|---|---|---|
| CN | 102395966 | 3/2012 |
| CN | 102467574 | 5/2012 |
| CN | 103226949 | 7/2013 |
| CN | 103548025 | 1/2014 |
| CN | 104951428 | 9/2015 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| JP | 2000-298676 | 10/2000 |
| JP | 2002-132804 | 5/2002 |
| JP | 2012-027950 | 2/2012 |
| JP | 2012-221480 | 11/2012 |
| JP | 2014-86088 | 5/2014 |
| JP | 2014-142919 | 8/2014 |
| JP | 2014-170397 | 9/2014 |
| JP | 2015-531136 | 10/2015 |
| KR | 20110003462 | 1/2011 |
| KR | 20130008036 | 1/2013 |
| KR | 10-2013-0050871 | 5/2013 |
| KR | 20130061387 | 6/2013 |
| KR | 1020150037935 | 4/2015 |
| KR | 10-2015-0108096 | 9/2015 |
| KR | 10-2017-0032883 | 3/2017 |
| WO | 2004/104758 | 12/2004 |
| WO | 2011/002989 | 1/2011 |
| WO | 2016130788 | 8/2016 |
| WO | 2016204428 | 12/2016 |
| WO | 2018089109 | 5/2018 |

OTHER PUBLICATIONS

EPO, Communication Pursuant to Article 94(3) EPC for European Patent Application No. 16825666.7, dated Apr. 23, 2019, 6 pages.

USPTO, Non-final Office Action for U.S. Appl. No. 15/709,423, dated May 2, 2019, 21 Pages.

KIPO, Notice of Preliminary Rejection for Korean Patent Application No. 10-2019-7011687, dated May 7, 2019, 3 pages.

KIPO, Notice of Final Rejection for Korean Patent Application No. 10-2018-7013953, dated May 8, 2019, 4 pages.

USPTO, Notice of Allowance for U.S. Appl. No. 15/624,637, dated Apr. 19, 2019, 6 pages.

USPTO, Notice of Allowance for U.S. Appl. No. 15/350,040, dated Apr. 24, 2019, 16 pages.

USPTO, Notice of Allowance for U.S. Appl. No. 15/238,304, dated Apr. 5, 2019, pages.

USPTO, Notice of Allowance for U.S. Appl. No. 16/003,661, dated May 1, 2019, 11 pages.

(56) References Cited

OTHER PUBLICATIONS

EPO, Written Opinion of the International Preliminary Examining Authority for International Patent Application No. PCT/US2018/021028, dated Jun. 14, 2019, 11 pages.
KIPO, Notice of Final Rejection for Korean Patent Application No. 10-2018-7013953, dated Jun. 13, 2019, 4 pages.
KIPO, Notice of Preliminary Rejection for Korean Patent Application No. 10-2018-7019756, dated May 13, 2019, 9 pages.
USPTO, Final Office Action for U.S. Appl. No. 15/386,162, dated Jun. 5, 2019, 13 pages.
USPTO, Final Office Action for U.S. Appl. No. 15/386,760, dated May 30, 2019, 13 pages.
Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.
WIPO, International Preliminary Report on Patentability for International Patent Application No. PCT/US2017/057044, dated Jul. 30, 2019, 9 pages.
JPO, Office Action for Japanese Patent Application No. 2018-551908, dated Aug. 20, 2019, 4 pages.
JPO, Office Action for Japanese Patent Application No. 2018-532399, dated Jul. 23, 2019, 6 pages.
KIPO, Notice of Preliminary Rejection for Korean Patent Application No. 10-2019-7024479, dated Sep. 18, 2019, 18 pages.
KIPO, Notice of Allowance for Korean Patent Application No. 10-2019-7011687, dated Sep. 26, 2019, 4 pages.
Lardinois, "Allo brings Google's smarts to messaging", https://techcrunch.com/2016/09/20/allo-brings-googles-smarts-to-messaging/, Sep. 2016, 14 pages.
APO, Notice of Acceptance for Australian Patent Application No. 2015214298, dated Apr. 20, 2018, 3 pages.
APO, Examination Report No. 1 for Australian Patent Application No. 2015214298, dated Apr. 24, 2017, 3 pages.
APO, Examination Report No. 2 for Australian Patent Application No. 2015214298, dated Nov. 2, 2017, 3 pages.
USPTO, International Search Report and Written Opinion for International Patent Application No. PCT/US2015/014414, dated May 11, 2015, 8 pages.
EPO, Extended European Search Report for European Patent Application No. 15746410.8, dated Sep. 5, 2017, 7 pages.
USPTO, Notice of Allowance for U.S. Appl. No. 14/618,962, dated Nov. 8, 2016, 14 pages.
USPTO, Notice of Allowance for U.S. Appl. No. 15/428,821, dated Jan. 10, 2018, 20 pages.
USPTO, Non-final Office Action for U.S. Appl. No. 14/618,962, dated Feb. 26, 2016, 25 pages.
USPTO, Non-final Office Action for U.S. Appl. No. 15/428,821, dated May 18, 2017, 30 pages.
USPTO, Non-final Office Action for U.S. Appl. No. 15/946,342, dated Jul. 26, 2018, 40 pages.
Yeh, et al., "Searching the web with mobile images for location recognition", Proceedings of the 2004 IEEE Computer Society Conference on Pattern Recognition, vol. 2, Jun.-Jul. 2004, pp. 1-6.
EPO, Written Opinion of the International Preliminary Examination Authority for International Patent Application No. PCT/US2017/057044, dated Dec. 20, 2018, 8 pages.
EPO, International Search Report for International Patent Application No. PCT/US2016/068083, dated Mar. 9, 2017, 4 pages.
EPO, Written Opinion for International Patent Application No. PCT/US2016/068083, dated Mar. 9, 2017, 9 pages.
EPO, International Search Report and Written Opinion for PCT Application No. PCT/US2017/046858, dated Oct. 11, 2017, 10 Pages.
EPO, Written Opinion of the International Preliminary Examining Authority for International Patent Application No. PCT/US2017/052713, dated Oct. 15, 2018, 6 pages.
International Bureau of WIPO, International Preliminary Report on Patentability for International Patent Application No. PCT/US2016/068083, dated Jul. 5, 2018, 9 pages.
KIPO, Preliminary Rejection for Korean Patent Application No. 10-2018-7013953, dated Oct. 29, 2018, 5 pages.
USPTO, First Action Interview, Pre-Interview Communication for U.S. Appl. No. 16/003,661, dated Aug. 29, 2018, 6 pages.
USPTO, First Action Interview, Office Action Summary for U.S. Appl. No. 16/003,661, dated Dec. 14, 2018, 16 pages.
USPTO, First Action Interview, Office Action Summary for U.S. Appl. No. 15/624,637, dated Jan. 25, 2019, 5 pages.
USPTO, First Action Interview, Office Action Summary for U.S. Appl. No. 15/386,760, dated Jan. 30, 2019, 8 pages.
USPTO, Non-final Office Action for U.S. Appl. No. 15/238,304, dated Jun. 7, 2018, 17 pages.
USPTO, Final Office Action for U.S. Appl. No. 15/238,304, dated Nov. 23, 2018, 14 pages.
USPTO, Non-final Office Action for U.S. Appl. No. 15/386,162, dated Nov. 27, 2018, 12 pages.
USPTO, First Action Interview, Pre-Interview Communication for U.S. Appl. No. 15/386,760, dated Nov. 6, 2018, 5 pages.
USPTO, First Action Interview, Pre-Interview Communication for U.S. Appl. No. 15/624,637, dated Oct. 19, 2018, 4 pages.
EPO, International Search Report and Written Opinion for International Patent Application No. PCT/US2016/068083, dated Mar. 9, 2017, 13 pages.
EPO, International Search Report for International Patent Application No. PCT/US2017/052713, dated Dec. 5, 2017, 4 Pages.
EPO, International Search Report for International Patent Application No. PCT/US2018/022501, dated May 14, 2018, 4 pages.
EPO, International Search Report for International Patent Application No. PCT/US2017/052349, dated Dec. 13, 2017, 5 pages.
EPO, International Search Report for International Patent Application No. PCT/US2017/057044, dated Jan. 18, 2018, 5 pages.
EPO, Written Opinion for International Patent Application No. PCT/US2017/057044, dated Jan. 18, 2018, 5 pages.
EPO, Written Opinion for International Patent Application No. PCT/US2017/052713, dated Dec. 5, 2017, 6 Pages.
EPO, International Search Report for International Patent Application No. PCT/US2018/022503, dated Aug. 16, 2018, 6 pages.
EPO, Written Opinion for International Patent Application No. PCT/US2017/052349, dated Dec. 13, 2017, 6 pages.
EPO, Written Opinion for International Patent Application No. PCT/US2018/022501, dated May 14, 2018, 6 pages.
EPO, Written Opinion for International Patent Application No. PCT/US2018/022503, dated Aug. 16, 2018, 8 pages.
EPO, Written Opinion of the International Preliminary Examining Authority for International Patent Application No. PCT/US2017/052349, dated Aug. 6, 2018, 9 pages.
Fuxman, Ariel, ""Aw, so cute!": Allo helps you respond to shared photos", Google Research Blog, https://research.googleblog.com/2016/05/aw-so-cute-allo-helps-you-respond-to.html, May 18, 2016, 6 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
Lee, Jang Ho et al., "Supporting multi-user, multi-applet workspaces in CBE", Proceedings of the 1996 ACM conference on Computer supported cooperative work, ACM, Nov. 16, 1996, 10 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
PCT, "International Search Report and Written Opinion for International Application No. PCT/US2018/021028", dated Jun. 15, 2018, 11 Pages.
Russell, "Google Allo is the Hangouts Killer We've Been Waiting for", Retrieved from the Internet: http://web.archive.org/web/20160519115534/https://www.technobuffalo.com/2016/05/18/google-allo-hangouts-replacement/, May 18, 2016, 3 pages.

(56) References Cited

OTHER PUBLICATIONS

USPTO, Notice of Allowance for U.S. Appl. No. 15/709,418, dated Mar. 1, 2018, 11 pages.
USPTO, Non-final Office Action for U.S. Appl. No. 15/709,418, dated Nov. 21, 2017, 15 pages.
USPTO, Notice of Allowance for U.S. Appl. No. 15/415,506, dated Jul. 23, 2018, 25 pages.
USPTO, First Action Interview, Pre-Interview Communication for U.S. Appl. No. 15/415,506, dated Apr. 5, 2018, 5 pages.
USPTO, First Action Interview, Pre-Interview Communication for U.S. Appl. No. 15/350,040, dated Jul. 16, 2018, 5 pages.
Vinyals, O. et al., "Show and Tell: A Neural Image Caption Generator", arXiv:1411.4555v2 [cs.CV], Apr. 20, 2015, pp. 1-9.
WIPO, International Preliminary Report on Patentability for International Patent Application No. PCT/US2018/021028, dated Nov. 28, 2019, 10 pages.
USPTO, Notice of Allowance for U.S. Appl. No. 15/709,423, dated Oct. 9, 2019, 19 pages.
USPTO, Non-final Office Action for U.S. Appl. No. 15/386,760, dated Oct. 11, 2019, 12 pages.
KIPO, Notice of Final Rejection for Korean Patent Application No. 10-2018-7019756, dated Nov. 25, 2019, 3 pages.
USPTO, First Action Interview, Office Action Summary for U.S. Appl. No. 15/350,040, dated Oct. 30, 2018, 4 pages.
USPTO, Notice of Allowance for U.S. Appl. No. 15/624,638, dated Feb. 28, 2019, 21 Pages.
Blippar, "Computer Vision API", www.web.blippar.com/computer-vision-api, 4 pages.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
Pinterest, "Pinterest Lens", www.help.pinterest.com/en/articles/pinterest-lens, 2 pages.
JPO, Office Action for Japanese Patent Application No. 2018-532399, dated Mar. 10, 2020, 4 pages.
USPTO, First Action Interview, Office Action Summary for U.S. Appl. No. 15/912,796, dated Mar. 13, 2020, 5 pages.
JPO, Office Action for Japanese Patent Application No. 2019-547462, dated Feb. 18, 2020, 11 Pages.
WIPO, International Preliminary Report on Patentability for International Patent Application No. PCT/US2018/022501, dated Dec. 17, 2019, 7 pages.
WIPO, International Preliminary Report on Patentability for International Patent Application No. PCT/US2018/022503, dated Dec. 17, 2019, 9 pages.
USPTO, First Action Interview, Pre-Interview Communication for U.S. Appl. No. 15/912,796, dated Jan. 8, 2020, 5 pages.
KIPO, Notice of Preliminary Rejection (with English translation) for Korean Patent Application No. 10-2019-7020465, dated Jan. 10, 2020, 9 pages.
KIPO, Notice of Allowance (with English translation) for Korean Patent Application No. 10-2019-7024479, dated Jan. 17, 2020, 4 pages.
KIPO, Notice of Final Rejection for Korean Patent Application No. 10-2018-7019756, dated Jan. 17, 2020, 4 pages.
USPTO, Final Office Action for U.S. Appl. No. 15/386,760, dated Jan. 10, 2020, 12 pages.
CNIPA, First Office Action for Chinese Patent Application No. 201680070359.3, dated Jun. 3, 2020, 9 pages.
EPO, Communication Pursuant to Article 94(3) EPC for European Patent Application No. 16825663.4, dated May 7, 2020, 5 pages.
IPO, First Examination Report for Indian Patent Application No. 201847014172, dated Jun. 17, 2020, 7 pages.
USPTO, Non-final Office Action for U.S. Appl. No. 16/569,273, dated Oct. 18, 2019, 21 pages.
JPO, Notice of Allowance (including English translation) for Japanese Patent Application No. 2019-547462, dated May 28, 2020, 2 pages.
USPTO, Notice of Allowance for U.S. Appl. No. 15/386,760, dated Apr. 24, 2020, 9 pages.
USPTO, Notice of Allowance for U.S. Appl. No. 16/569,273, dated Feb. 20, 2020, 17 pages.
USPTO, Non-final Office Action for U.S. Appl. No. 16/560,815, dated May 18, 2020, 16 pages.
EPO, Communication Pursuant to Article 94(3) EPC for European Patent Application No. 16825666.7, dated Jun. 18, 2020, 6 pages.
EPO, Communication Pursuant to Article 94(3) EPC for European Patent Application No. 18716399.3, dated Jul. 3, 2020, 6 pages.
EPO, Communication Pursuant to Article 94(3) EPC for European Patent Application No. 17794825.4, dated Aug. 4, 2020, 8 pages.
JPO, Office Action (with English translation) for Japanese Patent Application No. 2019-518995, dated Jul. 28, 2020, 5 pages.
KIPO, Notice of Final Rejection (with English translation) for Korean Patent Application No. 10-2019-7020465, dated Jun. 29, 2020, 4 pages.
USPTO, First Action Interview, Pre-Interview Communication for U.S. Appl. No. 16/436,632, dated Aug. 14, 2020, 5 pages.
CNIPA, First Office Action (with English translation) for Chinese Patent Application No. 201680082643.2, Aug. 5, 2020, 24 pages.
JPO, Notice of Allowance (with English translation) for Japanese Patent Application No. 2018-532399, Sep. 23, 2020, 2 pages.
KIPO, Notice of Allowance (with English translation) for Korean Patent Application No. 10-2019-7020465, Aug. 5, 2020, 5 pages.
USPTO, Notice of Allowance for U.S. Appl. No. 15/912,796, Aug. 20, 2020, 9 pages.
USPTO, Notice of Allowance for U.S. Appl. No. 16/552,902, Aug. 27, 2020, 10 pages.
USPTO, Notice of Allowance for U.S. Appl. No. 16/560,815, Aug. 31, 2020, 11 pages.
USPTO, Notice of Allowance for U.S. Appl. No. 16/230,788, Oct. 2, 2020, 15 pages.

* cited by examiner

IMAGE ARCHIVAL BASED ON IMAGE CATEGORIES

RELATED APPLICATIONS

This application claims the benefit of U.S. Application No. 62/507,048, entitled "SUGGESTED ACTIONS FOR IMAGES", and filed on May 16, 2017, which is incorporated herein by reference in its entirety.

BACKGROUND

The widespread availability of digital image capture devices, e.g., digital cameras, smartphones, wearable cameras, computers with built-in cameras, etc. has led to the capture of an order of magnitude greater number of images than with film cameras. Capture of images and storage of captured images is inexpensive owing to the relatively low cost of such devices and storage. While film cameras were typically restricted to certain uses, e.g., professional photography, family or business events, travel photography, etc., modern digital cameras are used for many other purposes. For example, sharing captured images via social networks, image sharing applications, or messaging applications is a popular activity. Further, images are also captured for recordkeeping, reminders, and reference purposes (e.g., a receipt, a note, a picture of a product, etc.).

The background description provided herein is for the purpose of generally presenting the context of the disclosure. Work of the presently named inventors, to the extent it is described this background section, as well as aspects of the description that may not otherwise qualify as prior art at the time of filing, are neither expressly nor impliedly admitted as prior art against the present disclosure.

SUMMARY

Implementations of the present application relate to techniques to analyze an image provide suggested actions, and execute a command based on user input indicative of selection of a particular action. In some implementations, a computer-implemented method includes obtaining an image, programmatically analyzing the image to determine one or more suggested actions for the image, and causing a user interface to be displayed. The user interface includes the image, a plurality of first user interface elements each corresponding to a respective default action of one or more default actions, and one or more second user interface elements each corresponding to a respective suggested action of the one or more suggested actions. The method includes receiving user input indicative of selection of a particular action from one of: the one or more default actions or the one or more suggested actions. In response to receiving the user input, the method causes a command for the particular action to be executed.

Various implementations and examples of the method are described. In some implementations, programmatically analyzing the image includes applying a classifier to the image to determine one or more categories for the image. The one or more categories may be associated with at least one of the one or more suggested actions. In some implementations, programmatically analyzing the image includes sending a representation of the image to a server; and receiving a response from the server that includes at least one of the one or more suggested actions. In some implementations, sending the representation to the server includes sending an image thumbnail that has a smaller data size than the image.

In some implementations, programmatically analyzing the image comprises determining a parameter for the command based on mage data that includes values of a plurality of pixels of the image and/or image metadata. In some implementations, the command is associated with a software application. In these implementations, causing the command to be executed includes invoking the software application with the parameter.

In some implementations, obtaining the image comprises detecting that the image has been captured based on detecting activation of a camera and/or receiving a notification from an operating system that the image has been written to a local memory. In some implementations, the method further includes generating the user interface within a threshold time after detecting that the image has been captured. In some implementations, the user interface is generated by an application different from a camera application that captured the image. In some implementations, the user interface is displayed over a camera user interface of a camera application.

In some implementations, the one or more default actions include sharing the image, archiving the image, and performing a visual search based on the image. In some implementations, programmatically analyzing the image includes identifying at least two distinct portions of the image. In these implementations, the suggested actions include at least two actions that are each associated with a respective portion of the at least two distinct portions.

In some implementations, a computer-implemented method includes obtaining an image and programmatically analyzing the image to determine a plurality of image features. The method further includes determining a category for the image based on the plurality of image features. In some implementations, the category is associated with an action. In some implementations, the method includes causing the action to be performed. The method further includes causing a user interface to be displayed. The user interface includes the image and an indication that the action was performed.

In various implementations, the method includes to cause the user interface to be displayed includes highlighting a portion of the image. The highlighted portion of the image corresponds to the category. In some implementations, the method includes storing the image and the category such that the image is included in an image group for the category. In some implementations, the method determines the category by applying an image classifier trained to identify the category for the image from a plurality of categories. In some implementations, applying the image classifier includes generating a confidence score for the image for each of the plurality of categories and identifying the category based on determination that the confidence score for the category meets a confidence threshold.

In some implementations, determining the category comprises determining that the image includes contact information. In these implementations, the method further includes extracting one or more of an e-mail address, a phone number, a physical address, and/or a social media address from the image, wherein the action is to add a contact in an address book based on the extracting. In some implementations, determining the category comprises determining that the image includes a media item. In these implementations, the action includes adding the media item to a wishlist, adding the media item to a playlist, or purchasing the media item.

In some implementations, a computer-implemented method includes obtaining a plurality of images and programmatically analyzing the plurality of images to determine a plurality of image features. The method includes determining one or more image categories for the plurality of images based on the plurality of image features. The method includes identifying a subset of the plurality of images based on the one or more image categories. Each image in the subset of the plurality of images is associated with an image category for archival. The method further includes causing a user interface to be displayed that includes one or more images of the subset, receiving first user input to archive at least one of the one or more images of the subset; and in response to the first user input, removing the at least one of the one or more images of the subset from a view of the plurality of images.

In some implementations, the method includes updating metadata of each image in the subset with respective one or more image categories for the image. In some implementations, the method includes storing image identifiers and the one or more image categories for the plurality of images in a database, receiving second user input indicative of selection of a particular category of the one or more image categories and in response to receiving the second user input, performing a database lookup to identify one or more images for the particular category based on the image identifiers and the one or more image categories, and causing the one or more images for the particular category to be displayed. In some implementations, the image category for archival includes one or more of document, meme, and/or screenshot. In some implementations, determining the one or more image categories includes applying an image classifier trained to classify input images as a document, meme, and/or screenshot. In some implementations, the input images are classified based on metadata of the input images and/or pixel values of the input images.

In some implementations, a system comprises one more hardware processors and a storage device, configured to perform operations comprising a method according to any implementation or aspect described herein.

In some implementations, a computer-readable storage medium (which may be non-transitory computer-readable storage medium) stores instructions that, when executed by a processor, cause the processor to perform operations comprising a method according to any implementation or aspect described herein.

DETAILED DESCRIPTION

Figure 1:
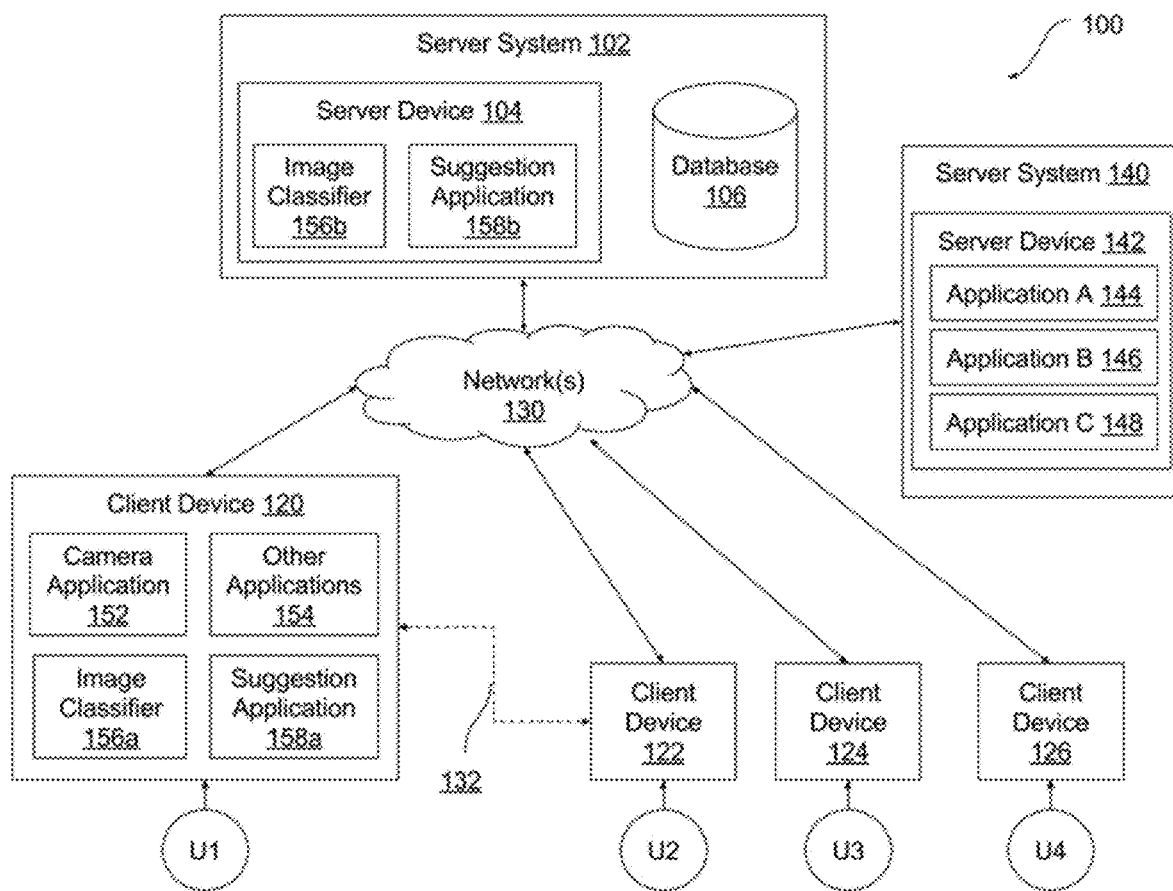
FIG. 1 is a block diagram of an example network environment which may be used for one or more implementations described herein.

With the easy availability and low cost of cameras (e.g., in smartphones, tablets, laptop computers, and other devices), and use of applications such as messaging applications, e-mail applications, social media applications, etc., users may acquire image collections that include thousands of images. For example, users may utilize images as to-do lists, as reminders, etc. Techniques used for image management, e.g., image gallery or image management software, do not take into account such user behavior. For example, while such techniques enable users to enhance images, organize images into image albums, etc., the techniques do not provide assistance to the user. Further, such techniques do not recognize different categories of images or user intent for use of images, e.g., as input to a computing device.

A technical problem in image management is to recognize image content and determine user intent to capture or store an image. For example, if a user takes images of documents, a user intent may be to store the image in an archive, e.g., that is accessible even when the user no longer possesses an original document. In another example, if a user takes images of media items, e.g., books or media covers, a user intent may be for the image to serve as a reminder to read the book, or view the media, etc. In another example, if a user takes a picture of a handwritten note, or a whiteboard, a user intent may be to add text content from the picture to a to-do list or a notes application. In another example, if a user receives an image via a messaging application, e.g., a humorous image, a greeting, etc., a user may no longer want to access the image once it has been viewed. In these examples, users capture or otherwise obtain images as an alternative to manual input, e.g., manually typing a title of a book into a wishlist, adding a reminder, etc.

One or more implementations described herein include applying an image classifier to determine image features, image categories, and suggested actions for an image. In various implementations, the image classifier may be implemented such that it can recognize image categories for any input image. For example, the image classifier may be a machine-learning application that implements a trained model and an inference engine. The trained model enables the inference engine to recognize features from any input image and determine one or more image categories.

In some implementations, a suggestion application may be implemented that determines one or more actions based on analysis of the image, e.g., by the image classifier. In some implementations, the suggestion application may be configured to store a mapping between image categories and one or more applications for an action determined based on the image categories. In some implementations, the suggestion application is configured to determine an available software application (e.g., locally on a user device, a server application, etc.) that can execute a command corresponding to the determined intent. In some implementations, image analysis may also include determining one or more parameters (e.g., text extracted from the image, an identifier of an object or landmark depicted in the image, etc.) that may be used to invoke the software applications. In that manner, the task of determining the applications and the one or more parameters is automated such that the user is freed from this task and so that user interaction and invocation of an application with respective parameters can occur more quickly.

One or more implementations aid users to manage image collections, e.g., collections of photos, videos, etc. Implementations provided herein assist users to manage image collections, enable use of images as input, e.g., as actionable objects, and automate tasks. The implementations provide benefits by automatically recognizing image content, facilitating input of data to a computing device by reducing requirements of manual data entry, and reducing cognitive burden in managing large image collections.

In some implementations, one or more images are obtained by a computing device e.g., photos or videos captured using a smartphone camera application, received via a messaging application, etc. Obtained images are programmatically analyzed to determine image features and to determine one or more image categories for the image, e.g., document, receipt, business card, book cover, etc. In some implementations, programmatically analyzing the image may include applying an image classifier (e.g., a machine-learning classifier) that is configured to determine such categories. In some implementations, a confidence score is generated for the determined image categories, e.g., by the image classifier. In some implementations, optical character recognition (OCR), including machine-learning based OCR techniques (e.g., using LSTM nodes) are applied to recognize portions of the image, e.g., as text, barcode, quick response (QR) code, etc.

In some implementations, images may be recognized as including actionable objects. In response to such recognition, one or more suggested actions, e.g., call a phone number extracted from the image, buy a product depicted in the image using a shopping application, open a website with information about a landmark recognized in the image, etc. are provided in a user interface. In some implementations, parameters for the suggested action are determined based on the image, e.g., a book title, an object or a landmark in the image, etc. User interfaces are provided which enable users to select one or more of the suggested actions. In response to user selection of a suggested action, an application (e.g., a software application on a client device) is invoked, e.g., a command is executed with the one or more determined parameters. For example, if the user provides input indicative of selection of a suggestion to call a phone number, a dialer application is invoked to place a call to the phone number. In this manner, techniques disclosed herein enable images to act as input to a device and enable the user to perform actions (and/or enables actions to be performed by a user device) based on images without having to enter data (e.g., phone number) manually using an input device such as a touchscreen, a keyboard/mouse, or by voice input.

In some implementations, one or more actions may be determined based on image categories for an image. Based on user preferences, the one or more actions may be performed automatically and an indication that the action was performed may be provided in a user interface. In some implementations, the actions may include archiving the image such that the image is not included in a view (e.g., a chronological view) of images, storing data recognized from the image, e.g., adding a contact to an address book based on information from an image of a business card, invoking an application to perform a task based on the image, e.g., to add a book to a wishlist, etc. In some implementations, archiving the image may remove it from a chronological view of images. In some implementations, archiving the image can remove that image from a set of images that are displayed and/or displayable (and/or eligible to be displayed) in a view of a graphical user interface. These implementations may provide a user benefit of reducing clutter by removing images that are associated with image categories, e.g., duplicate images, images of documents, memes, etc. and enable the user to focus on images that are likely of interest. These implementations may provide technical advantages of reducing the consumption of device resources (e.g., display memory or other memory/storage, processor operations, power consumption, etc.) utilized to display images that would be removed from display when using one or more disclosed techniques.

Additional features include providing a user interface within a threshold time upon capture of an image. The user interface enables a user to select from one or more default actions and/or one or more suggested actions, or provides indications of actions performed based on the captured image. In some implementations, the user interface may be generated by an application separate from a camera application that was used to capture the image. In some implementations, the user interface may be provided at a time after the image capture, e.g., when a user reviews images using an image management application such as an image gallery. These implementations may provide technical advantages of reducing the consumption of device resources (e.g., memory or other storage, processor operations, power consumption, etc.) utilized for management of images and determination/reception of user input on a device, e.g., by offering relevant and useful actions and suggestions for selection, without the user having to browse images, call up interface menus and provide input to such menus, and/or initiate other involved device operations that consume device resources.

FIG. 1 illustrates a block diagram of an example network environment 100, which may be used in some implementations described herein. In some implementations, network environment 100 includes one or more server systems, e.g., server system 102 and second server system 140 in the example of FIG. 1. Server systems 102 and 140 can communicate with a network 130, for example. Server system 102 can include a server device 104 and a database 106 or other storage device. In some implementations, server device 104 may provide an image classifier 156b and/or a suggestion application 158b. Second server system 140 can include a second server device 142, configured to provide one or more applications, e.g., application A 144, application B 146, and application C 148. Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, second server system 140, and second server device 142, and shows four blocks for client devices 120, 122, 124, and 126. Server blocks 102, 104, 106, 140, and 142 may represent multiple systems, server devices, and network databases, and the blocks can be provided in different configurations than shown. For example, server system 102 and/or second server system 140 can represent multiple server systems that can communicate with other server systems via the network 130. In some implementations, server system 102 and/or second server system 140 can include cloud hosting servers, for example. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 or second server system 140, and/or via a network service, e.g., a social network service or other type of network service, implemented on server system 102 or second server system 140. For example, respective client devices 120, 122, 124, and 126 may communicate data to and from one or more server systems (e.g., system 102, second server system 140). In some implementations, the server system 102 and/or second server system 140 may provide appropriate data to the client devices such that each client device can receive communicated content or shared content uploaded to the server system 102 or second server system 140 and/or network service. In some examples, users U1-U4 can interact via audio or video conferencing, audio, video, or text chat, or other communication modes or applications. A network service implemented by server system 102 or second server system 140 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide camera application 152, image classifier 156a, suggestion application 158a, and one or more other applications 154. Client devices 122-126 may also provide similar applications. For example, camera application 152 may provide a user of a respective client device (e.g., users U1-U4 with the ability to activate and utilize a camera (not shown) of client device 122 to capture an image and/or video. For example, camera application 152 may be a software application that executes on client device 120. In some implementations, camera application 152 may provide a camera user interface. In some implementations, the camera user interface of camera application 152 may provide user U1 with an option to choose a particular camera on client device 120, e.g., if client device 120 has a plurality of cameras, e.g., a front camera and a back camera. Further, the camera user interface of camera application 152 may provide user U1 with the ability to control one or more settings of the chosen camera, e.g., an aperture, a shutter speed, a zoom level, etc. The camera user interface of camera application 152 may also provide user U1 with the ability to control an operational mode, e.g., a slow-motion mode, a single-image capture mode, a video capture mode, etc. In some implementations, camera application 152 may provide users with options related to image settings (e.g., image resolution, image size, image orientation, image format such as raw, JPEG, etc.) and/or image effects (e.g., a lens blur effect, a panorama effect, etc.). In some implementations, camera application 152 may provide access to settings, operational modes, image processing effects, etc. via a user interface, e.g., displayed on client device 120. Images and/or video captured by a camera of client device 120 may be stored, e.g., in local storage of client device 120, and/or storage provided by server system 102 or second server system 140.

In some implementations, client device 120 may include image classifier 156a. Image classifier 156a may be implemented using hardware and/or software of client device 120, as described with reference to FIG. 9. In different implementations, image classifier 156a may be a standalone image classifier, e.g., executed on any of client devices 120-124, or may work in conjunction with image classifier 156b provided on server system 102. Image classifier 156a and image classifier 156b may provide image analysis functions.

In some implementations, client device 120 may also include suggestion application 158a. Suggestion application 158b may be implemented using hardware and/or software of client device 120. In different implementations, suggestion application 158a may be a standalone application, e.g., executed on any of client devices 120-124, or may work in conjunction with suggestion application 158b provided on server system 102. Suggestion application 158a and suggestion application 158b may provide one or more suggestions with reference to an image, e.g., an image captured by client device 120, an image stored on client device 120, an image accessed by client 120, e.g., over network 130, etc.

In some implementations, client device 120 may include one or more other applications 154. For example, other applications 154 may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of other applications 154 may be standalone applications that execute on client device 120. In some implementations, one or more of other applications 154 may access a server system, e.g., second server system 140, that provides data and/or functionality of applications 154. For example, any of applications 144, 146, and 148, shown as being provided by second server system 140 may provide data and/or commands to one or more of other applications 154. In some implementations, server applications 144-148 may be standalone applications that are accessed by a client device, e.g., via a web-browser, or other client-side program.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104 and/or second server device 142, e.g., application software or client software in communication with server system 102 and/or second server device 142. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, any of server system 102, second server system 140, and/or one or more client devices 120-126 can provide a communication application program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, etc. In some examples, the communication program can provide an option to broadcast a content post to a broadcast area, and/or can output a notification indicating that a content post has been received by the device and the device is in the defined broadcast area for the post. The communication program can display or otherwise output transmitted content posts and received content posts, e.g., in any of a variety of formats.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
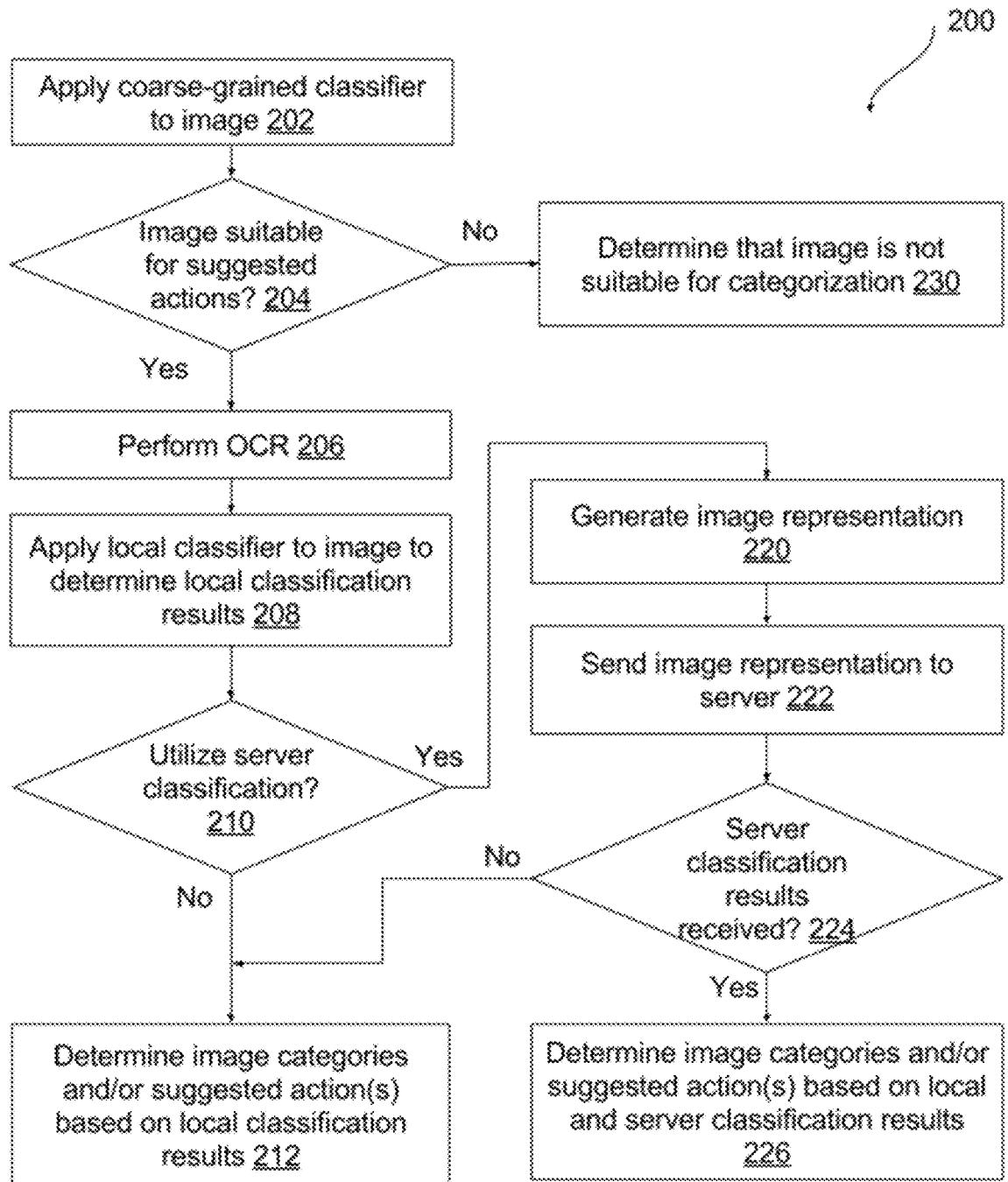
FIG. 2 is a flow diagram illustrating an example method to analyze an image, according to some implementations.

FIG. 2 is a flow diagram illustrating one example of a method 200 to analyze an image, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application being initiated by a user, receiving one or more images that have been newly uploaded to or accessible by the system, a predetermined time period having expired since the last performance of method 200, and/or one or more other conditions occurring which can be specified in settings read by the method. In some implementations, such conditions can be specified by a user in stored custom preferences of the user.

In one example, the first device can be a camera, cell phone, smartphone, tablet computer, wearable device, or other client device that can receive content input (e.g., image capture) by a user to the client device, and can perform the method 200. In another example, a client device or server device can receive one or more images uploaded from one or more users or received over a network connection, and can perform the method 200 for the one or more images. In another example, a client device can send an image to a server over a network, and the server can process the content using method 200. Some implementations can initiate method 200 based on user input. A user (e.g., operator or end-user) may, for example, have selected the initiation of the method 200 from a displayed user interface, e.g., application user interface or other user interface. In some implementations, method 200 may be implemented by a client device, e.g., in an image classifier 156a (local classifier) and a suggestion application 158a. In some implementations, method 200 may be implemented by a server device, e.g., in an image classifier 156b (local classifier) and a suggestion application 158b.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemagraphs where a portion of the image includes motion while other portions are static, etc.) and a video (e.g., a sequence of images or image frames that may include audio). While the remainder of this document refers to an image as a static image, it may be understood that the techniques described herein are applicable for dynamic images, video, etc. For example, implementations described herein can be used with still images (e.g., a photograph, an emoji, or other image), videos, or dynamic images Text, as referred to herein, can include alphanumeric characters, emojis, symbols, or other characters.

In block 202 of method 200, a coarse-grained classifier is applied to an image. In some implementations, coarse-grained classifier may be a component of image classifier 156a on a client device. Coarse-grained may refer to a relative level of classification in a semantic hierarchy that is organized into classes and subclasses. For example, a semantic hierarchy may be animals->mammals->bears->polar bear, where "animals" is a coarse-grained classification and "polar bear" is a fine-grained classification. The coarse-grained classifier may be implemented in a manner that it can perform image analysis to determine whether the image is suitable for a suggested action or automatic execution of a command. In an example implementation, the coarse-grained classifier provides a binary determination, e.g., that an image is suitable for a suggested action or automatic execution of a command ("suitable"), or that the image is not suitable for either suggested action or automatic execution of a command ("not suitable"). The coarse-grained classifier may be implemented using any suitable image analysis technique, e.g., machine-learning.

In an example scenario, an image analyzed by the coarse-grained classifier may be a photo of a scene, e.g., a crowd at a public place. In this example, the coarse-grained classifier may determine that the image is not suitable for a suggested action or automatic execution of an application. For example, the coarse-grained classifier may be trained, e.g., using a training set of images that include both suitable and unsuitable images to classify an image as suitable or unsuitable. In various examples, images suitable for a suggested action or automatic execution of an application may include images that include one or more of a human face, a media item (e.g., a book, a media cover such as vinyl/CD/DVD cover), a building, one more natural features (e.g., a tree, a mountain, etc.), a business card, a document (e.g., a recipe, a driver's license, passport, student id, etc.), text in one or more languages, etc. In various examples, unsuitable images may include, for example, a synthetic or computer-generated image, an image that has no features detectable by the coarse-grained classifier, a blank image, an out-of-focus image, etc. For example, if the user takes a photo of a sunset, the coarse-grained classifier may not detect an object in the image, and therefore the image may be determined as unsuitable.

In block 204, it is determined if the image is detected by the coarse-grained classifier as suitable or unsuitable. If the image is unsuitable, the method proceeds to block 230. At block 230, method 200 may provide an indication, e.g., to a calling application that invokes method 200, that the image is not suitable for categorization, suggested actions, or for automatic execution of an application. In some implementations, the indication may be stored, e.g., as metadata for the image. For example, storing the indication as metadata may be beneficial such that processing is not unnecessarily repeated because the coarse-grained classifier is not applied to an image, where the metadata indicates the image has been previously classified as suitable or unsuitable.

If it is determined in block 204 that the image is suitable, the method proceeds to block 206. In block 206, one or more optical character recognition (OCR) techniques are applied to detect and/or recognize text in the image. For example, applying OCR techniques may include performing image segmentation, e.g., to identify portions of the image that include text in one or more languages. OCR techniques may detect barcodes/Quick Response (QR) codes, printed text (e.g., from an image of a printed document, from an image of a media cover, etc.), handwritten text (e.g., from a handwritten note), etc. In some implementations, applying OCR techniques may include comparing one or more portions of the image with images of characters from a known alphabet, e.g., in various fonts. Based on a match of a portion of the image with a character, it may be determined that the portion of the image corresponds to that character.

In some implementations, applying OCR techniques may include performing OCR using a machine-learning application that includes an inference engine that is trained to perform character, word, or sentence recognition. For example, such machine-learning application may include a trained model (e.g., as a data file) that includes a model structure and weights (e.g., for a neural network) as inputs to an inference engine that can be executed using a processor of a device that implements block 204. In some implementations, there may be more than one trained models, e.g., a model for English language, a model for Russian language, etc.; a model for printed text, a model for handwritten text, a model for unclear text, etc. In some implementations, a single trained model that can handle multiple languages, text typed or written in different fonts, etc. may be provided. In some implementations, applying OCR techniques may include use of a dictionary.

In some implementations, the coarse-grained classifier of block 202 may provide one or more inputs (e.g., portions of images detected by the coarse-grained classifier as possibly including text) that are utilized when applying OCR. For example, if the coarse-grained classifier indicates portions of the image as not including text, OCR techniques may not be applied to such portions, saving computational cost. In some implementations, e.g., when the coarse-grained classifier determines that the image does not include text, block 206 is not performed. In some implementations, block 206 may be combined with other blocks, e.g., OCR techniques may be applied as part of the coarse-grained classifier of block 202, or OCR techniques may be included in the local classifier as described with reference to block 208.

In some implementations, OCR techniques may be applied to generate one or more parameters based on the image. For example, OCR techniques may generate as parameters one or more text extracts from the image. For example, when the image includes a business card, OCR techniques may recognize a name, a phone number, an email address, an address, a social network identifier, etc. from the image and provide those as parameters. In another example, when the image includes a bar code or a QR (Quick Response) code, the value of the bar code or the QR code may be provided as a parameter. The method proceeds to block 208.

In block 208, a local classifier is applied to the image. For example, the local classifier may be applied to the image by a client device that obtained the image, e.g., captured the image with a camera of the client device, received the image over a network, etc. In various implementations, the local classifier may implement one or more techniques to classify an image. For example, such techniques may include image segmentation, object detection and recognition, etc. In some implementations, the local classifier may be a machine-learning application. In these implementations, a trained model is provided, e.g., as a data file. A trained model for a classifier may be trained, e.g., using training data such that the model can be applied to any image to detect one or more image features, and determine one or more categories for the image. For example, training data may include any data such as images and corresponding categories that is permitted for use for training, e.g., synthetic or computer-generated data; data licensed for use for training; etc. A trained model may be trained using a large dataset, e.g., of millions of images, of different types such that a machine-learning application that utilizes an inference engine with the trained model, can detect and categorize an image.

In some implementations, trained model may be obtained based on supervised learning, e.g., based on training data include images and its corresponding categories. For example, a trained model may include model form or structure (e.g., descriptive of a number and organization of a plurality of nodes into layers of a neural network, with associated weights). In some implementations, trained model may be trained such that an inference engine that applies the trained model can recognize specific categories of images.

For example, such categories may include documents, receipts, bills, media covers (e.g., book, CD/DVD, vinyl, etc.), posters (e.g., movie posters), advertisements, product labels (e.g., food labels, wine labels, etc.), business cards, identity documents (e.g., driver's license, passport, etc.), products and brands (e.g., shoes, clothes, etc.), recipes, articles (e.g., in a magazine), whiteboards, offers or coupons, screenshots (e.g., images of a user interface displayed on a device screen) etc.

In some implementations, image categories may also include memes (e.g., images received via a messaging application or a social network) such as greeting images ("good morning," "hello," etc.), humorous images (e.g., cartoons, jokes, animated GIFs, etc.), motivational quotes, and other images that are commonly shared, e.g., by several people on a social media platform. In some implementations, image categories may further include bad photographs. For example, a photograph that is taken inadvertently, e.g., when a camera is activated due to inadvertent input, such as when the camera is in a user's pocket, may not depict any subject matter of interest to users. In another example, a photograph that is blurry, underexposed, or out-of-focus may be categorized as a bad photograph.

In some implementations, image categories may also include duplicates. For example, if the local classifier determines that the image is similar to one or more other images, e.g., that were previously analyzed by the local classifier, the local classifier may determine the category duplicates for all such images. For example, determination that images are duplicates may be based on the local classifier determining that image features are similar, e.g., have similar feature vectors. Such determination may be based on image metadata, if permitted by the user, (e.g., time of capture, location at which the image was captured) and/or pixel values of the image. In some implementations, similarity of image features can be determined based on whether one or more similarity thresholds are met, e.g., a threshold of similarity of image feature vectors, image pixel values, etc.

In some implementations, trained models may be updated, e.g., based on use of additional training data that enables the model to be trained to recognize additional categories of images, or to improve accuracy and/or speed of applying the model. In some implementations, e.g., when users provide consent to use of user data to update trained models, a trained model may be updated locally, e.g., on a particular client device, based on user activity or response. In these implementations, user data is not transmitted or shared. Further, if the user provides consent, updates to trained models may be provided over network 130, e.g., to server device 104 or one or more other client devices.

In some implementations, a trained model may be customized based on a device (e.g., client device 120-124) that the local classifier is executed on. For example, different client devices may have different processing capabilities based on available hardware, e.g., a single-core processor, a multi-core processor, one or more parallel processors, a graphics processor with a number of graphics processing units (GPUs), a reconfigurable processor (e.g., FPGA), a neural network processor, etc. Further, different client devices may have different availability levels of other resources such as memory, battery capacity, network bandwidth, etc. For example, a trained model with relatively higher complexity may be provided in a device (e.g., any of client device 120-124, or server device 104) that has a neural network processor or a GPU that is optimized for parallel processing, e.g., that the inference engine utilizes. In this example, greater processing capabilities of a client device are utilized to implement a trained model. In another example, a simplified trained model (e.g., with fewer neural network nodes or layers) may be provided in a client device that has greater resource constraints, e.g., a single-core processor with limited capabilities. In some implementations, multiple trained models may be provided on a client device. At the time of applying the local classifier, an appropriate trained model may be utilized, e.g., based on contextual factors such as network connectivity, battery capacity available, memory available, etc.

The local classifier analyzes the image to produce local classification results. In some implementations, the local classifier may perform the analysis based on image data, e.g., pixel values of the image. In some implementations, when users permit use of image metadata for such analysis, the local classifier may perform the analysis based on image metadata, such as a capture time, a type of camera used (e.g., a front camera, a back camera, etc.), an orientation of the image, etc. For example, local classification results may include one or more categories that are determined for the image. In some implementations, the local classifier may also generate a confidence score for each category for the image. For example, the local classification results may indicate that the image category is "document" with a confidence score of 95%, "receipt" with a confidence score of 90%, and so on. In some implementations, local classification results may be a single category for the image, e.g., book cover, poster, etc. In these implementations, a category with a highest confidence score may be determined as the single category.

In some implementations, local classification results may also include one or more parameters determined based on the image. For example, such parameters may be based on the local classifier recognizing one or more objects in the image. For example, if the image includes an image of Bryce Canyon as determined by the local classifier, the parameter may include "Bryce Canyon." In another example, if the local classifier detects a particular brand or product name, e.g., based on a brand logo being detected in the image, the brand name or product name may be a parameter. For example, if the image is of a t-shirt of a particular brand, parameters may include the brand name, and a color of the t-shirt, as determined by the local classifier. In another example, e.g., when the image includes a media cover, the parameters may include a title of the media item (e.g., book title, a movie title, an album title, etc.), a type of the media item (e.g., book, CD, DVD, video, etc.), an author of the media item (e.g., an author of a book, an artist or band that produced a music album, actor, director, etc.), and so on. The local classifier may also utilize results from OCR, e.g., parameters provided by applying OCR techniques as described with reference to block 306, in determining one or more parameters. The method proceeds to block 210.

In block 210, it is determined whether server classification is to be utilized. Server classification refers to applying a server-based classifier to the image. In some implementations, e.g., when a user of a client device denies permission to transmit user data (e.g., an image representation) to a server (or other client device), server classification is not utilized. In some implementations, e.g., when method 200 is implemented on a client device with limited local processing capability, server classification may be utilized, if permitted by the user of the client device. In some implementations, server classification may be utilized, e.g., if a network bandwidth available at a client device is sufficient to upload an image representation to a server, and may not be utilized otherwise (e.g., if the client device has limited or no network connectivity). In some implementations, server classification may be selectively utilized, e.g., when local classification results do not include a category for an image, or when local classification results include multiple categories, e.g., with confidence scores that do not meet a confidence score threshold. In some implementations, when users provide consent, server classification is utilized irrespective of local classification results. In some implementations server classification is used in combination with local classification.

Selectively utilizing server classification provides several technical advantages. For example, if a client device determines that the local classification results are reliable (e.g., have confidence scores that meet a threshold), it can display a user interface that includes the image with one or more suggested actions as described with reference to FIG. 3, or a user interface with an indication of a performed action as described with reference to FIG. 4, or a suggestion to archive an image as described with reference to FIG. 7, immediately upon image capture. Such display of the user interface may be displayed with lower latency than a user interface displayed where server classification is always utilized, e.g., by elimination of wait time to receive classification results from a server, e.g., over a network.

A further technical advantage is that network cost of uploading image representations to a server and downloading server classification results, and processing costs for the server to perform image classification, are saved. A further technical advantage is that only such image representations are sent to the server for which the local classification results are not sufficient, e.g., to display one or more suggested actions, or to perform an action based on the image. Therefore, network bandwidth is saved, by avoiding transmission of the image representation.

Server classification may provide certain technical advantages. For example, an image classifier on a server may be more accurate than a client classifier, e.g., due to server resources. If it is determined that server classification is to be utilized, the method proceeds to block 220. If it is determined that server classification is not to be utilized, the method proceeds to block 212.

In block 220, an image representation is generated. In some implementations, generating an image representation may include cropping the image, changing an orientation of the image, compressing the image (e.g., so that a data size, in bytes, of a resultant compressed image has a smaller data size than the original image, and is suitable for transmission over a low bandwidth network), changing a color space of the image (e.g., from RGV to YUV), etc. In some implementations, the image representation may be the resultant image after applying one or more of the described operations e.g., cropping changing orientation, compressing, changing color space, etc. For example, the resultant image may be an image thumbnail that is smaller in data size than the image itself. In some implementations, one or more of the described operations may be performed using machine-learning techniques. An image thumbnail may include one or more portions of the image, e.g., include a plurality of pixels that have values determined based on applying one or more of the described operations to the image.

In some examples, generating an image representation may include generating a knowledge representation of the image using a neural network. For example, a machine-learning application may be utilized to generate the knowledge representation. In some implementations, the machine-learning techniques used to generate the knowledge representation may include applying an inference engine that provides as inference the knowledge representation. For example, the knowledge representation may be a feature vector that represents the image as a set of vector values associated with various features. In some implementations, the knowledge representation may be usable, e.g., by the server to determine an image category. In some implementations where the image representation is a knowledge representation, the image representation may not correspond to pixels of the image. The knowledge representation may be in the form a data file generated based on the image. For example, the knowledge representation may be a feature vector generated by a local classifier, e.g., for an image of a 1D barcode, the representation could be a decoded numerical string.

In some implementations, block 220 is not performed, and instead, local classification results or data from the coarse-grained classifier are provided as the image representation. In various implementations, a server classifier may be configured to determine image categories based on the received image representation, e.g., image thumbnail, knowledge representation, local classification results, etc. In different implementations, an appropriate image representation may be chosen, e.g., based on available client resources such as processing capability, network bandwidth, storage capacity, etc. and based on the image. For example, a lower-resolution image representation may be chosen if the available client resources are small, while a higher-resolution image representation can be chosen if the available client resources are large (e.g., based on one or more resource thresholds). A technical advantage of using different types of image representations is that server classification may be savings in network costs, e.g., by transmitting a thumbnail image or knowledge representation that has a smaller data size than the original captured image. Further, different types of image representations may have different computational costs to generate and the client device may select the image representation based on available resources. This provides a technical advantage that client resources used to generate the image representation are reduced. The method proceeds to block 222.

In block 222, the image representation is sent to the server, e.g., to server device 104 over network 130. For example, one or more of an image thumbnail, a knowledge representation, and local classification results may be sent to the server. In some implementations, transmitting the image representation to the server also includes sending information to the server that indicates that the image is to be processed by the server only to generate classification results. User consent is obtained prior to generating or transmitting the image representation to the server. In implementations where users do not provide such consent, server classification is not performed.

In various implementations, a server, e.g., server device 104, may determine categories for the image based on the received image representation. In some implementations, server device 104 may utilize image classifier 156*b* to determine the server classification results. In some implementations, image classifier 156*b* may be implemented using machine-learning techniques, e.g., similar to image classifier 156*a* (local classifier). In some implementations, image classifier 156*b* may utilize a machine-learning application that includes a trained model and an inference engine. In some implementations, the trained model on the server may be different, e.g., more complex, version of the trained model of image classifier 156*a*. In some implementations, image classifier 156*b* may utilize a machine-learning application that is configured to utilize received image representations. For example, image classifier 156*b* may implement super-resolution techniques, e.g., to obtain a higher resolution image based on a received image thumbnail. In some implementations, image classifier 156*b* may be trained to determine image categories based on received knowledge representation of the image or based on received local classification results. In some implementations, server device 104 may also apply OCR techniques to the received image thumbnail to determine server classification results.

In some implementations, sending the image representation to the server may include sending a response time threshold for the server to provide server classification results. For example, the response time threshold may be specified in a unit of time, e.g., 0.5 ms, 1 ms, etc. The response time threshold may indicate an amount of time, e.g., from a start time of transmission of the image representation or a time of capture of the image, within which the server classification results are to be received by a client device that sends the image representation. In these implementations, the server may apply image classifier 156*b* such that one or more server classification results are provided, e.g., generated by the server and transmitted to the requesting client device, within the response time threshold. For example, the server may allocate server resources and/or chose a particular type of image classifier 156*b*, based on the received image representation and/or the response time threshold. This provides a technical benefit of appropriate allocation of server resources to generate the server classification results. Further, a server may not process the image or abort processing the image to determine server classification results, e.g., if it determines that server classification results cannot be provided within the response time threshold.

The response time threshold provides several technical benefits. For example, the client device can provide a suggested action, or perform an automatic action in a timely manner such that users are provided with the suggested action quickly upon capturing the image or opening the image in an image viewing application, or that the automatic action is performed immediately upon image capture. A technical benefit is that the user interface that is displayed upon image capture can be rendered in such a manner that the user does not perceive lag between image capture and display, and additionally, receives UI elements such as suggested actions.

In some implementations, e.g., when the server device 104 includes a suggestion application 158*b*, server device 104 may determine one or more suggested actions (e.g., archival), or actions to be performed by the client device, based on the received image representation. The method proceeds to block 224.

In block 224, it is determined whether server classification results are received, e.g., within the response time threshold. If it is determined that the server classification results are not received within the response time threshold, the method proceeds to block 212. If it is determined that the server classification results are received within the response time threshold, the method proceeds to block 226.

In block 212, image categories and/or suggested actions are determined based on local classification results, e.g., results from the local classifier applied in block 208. For example, in some implementations, the image categories may be determined based on whether a confidence score associated with an image category meets a confidence threshold. For example, if the local classification results may indicate that the image category is "document" with a confidence score of 95% and the confidence threshold for the category document is "90%," it is determined that the image belongs to the category document. In some implementations, a particular category that is associated a highest confidence score may be determined as the category for the image. In some implementations, e.g., when multiple local classifiers are used, local classification results from each local classifier may be combined to determine the image category. For example, combining the classification results may include assigning weights to respective classification results from each local classifier based on respective confidence score, and selecting one or image categories for the image based on the weighted classification results. In some implementations, local classification results associated with low confidence scores may be discarded prior to determining the image categories.

In some implementations, determination of image categories may be based on a size and/or prominence of an image feature determined by the image classifier. For example, if a detected receipt object occupies a large portion (e.g., over a threshold size, such as 40%, etc.) of the entire area of an image, the image may be classified as a receipt, even in the presence of other features (e.g., books) that occupy a smaller portion (e.g., 15%) of the image area. In some implementations, prominence of an image feature can be determined based on size of the image feature with respect to image area, and/or location of the image feature within an image, e.g., with respect to borders of the image. In some implementations, a foreground and background of an image can be determined (e.g., based on relative sizes of depicted objects, types of depicted objects, depth information for the pixels, etc.), and an image feature located in the foreground can be detected as prominent. In an example, if a book cover object is prominent in the image, e.g., within a threshold distance of a center of the image, in a foreground portion of the image, etc., the image may be classified as a book cover.

In block 226, image categories and/or suggested actions are determined based on one or more of local classification results and server classification results. For example, if server classification results have higher confidence scores associated, the image categories may be determined solely based on server classification results. When the server utilizes a server classifier that is more accurate than the local classifier, e.g., due to use of a more accurate trained model, etc., server classification results may include greater confidence scores. In another example, e.g., when the received server classification results are not associated with higher confidence scores, or when the server classification results are different from the local classification results, both may be used to determine image categories. In some examples, e.g., when the server classification results and the local classification results do not overlap, server classification results may not be utilized to determine image categories. For example, non-overlapping results may occur, e.g., due to the image representation that is sent to the server, etc.

While method 200 has been described with reference to various blocks in FIG. 2, it may be understood that techniques described in this disclosure to determine image categories may be performed without performing some of the blocks of FIG. 2. For example, some implementations, e.g., that do not include a coarse-grained classifier, blocks 202 and 204 are not performed. In another example, some implementations, e.g., on a client device with limited processing capability, or a client device that is incapable of executing a local classifier, block 208 may not be performed, and if the user consents to use of server classification, image categories are determined based on performing blocks 220-226. In some implementations, one or more of the blocks illustrated in FIG. 2 may be combined. For example, blocks 206 and 208 may be combined, e.g., if the local classifier includes OCR techniques.

In various implementations, some of the blocks of method 200 may be performed in parallel or in an order different from that illustrated in FIG. 2. For example, in some implementations, block 210 may be performed prior to blocks 206 and/or 208 such that generating the image representation, sending the image representation to the server, and receiving server classification results is performed at the same time as applying the local classifier.

While the foregoing discussion refers to the server device 104, in some implementations, one or more of client devices 120-124 may provide server classification results. For example, a client device 120 of a user U1 may send an image representation to another client device of the user, e.g., over a local network, to obtain server classification results. For example, such approach may be useful when the client device 120 has limited capability to determine image categories, when the other client device is suitable (e.g., has parallel processing hardware) to determine classification results, etc.

Figure 3:
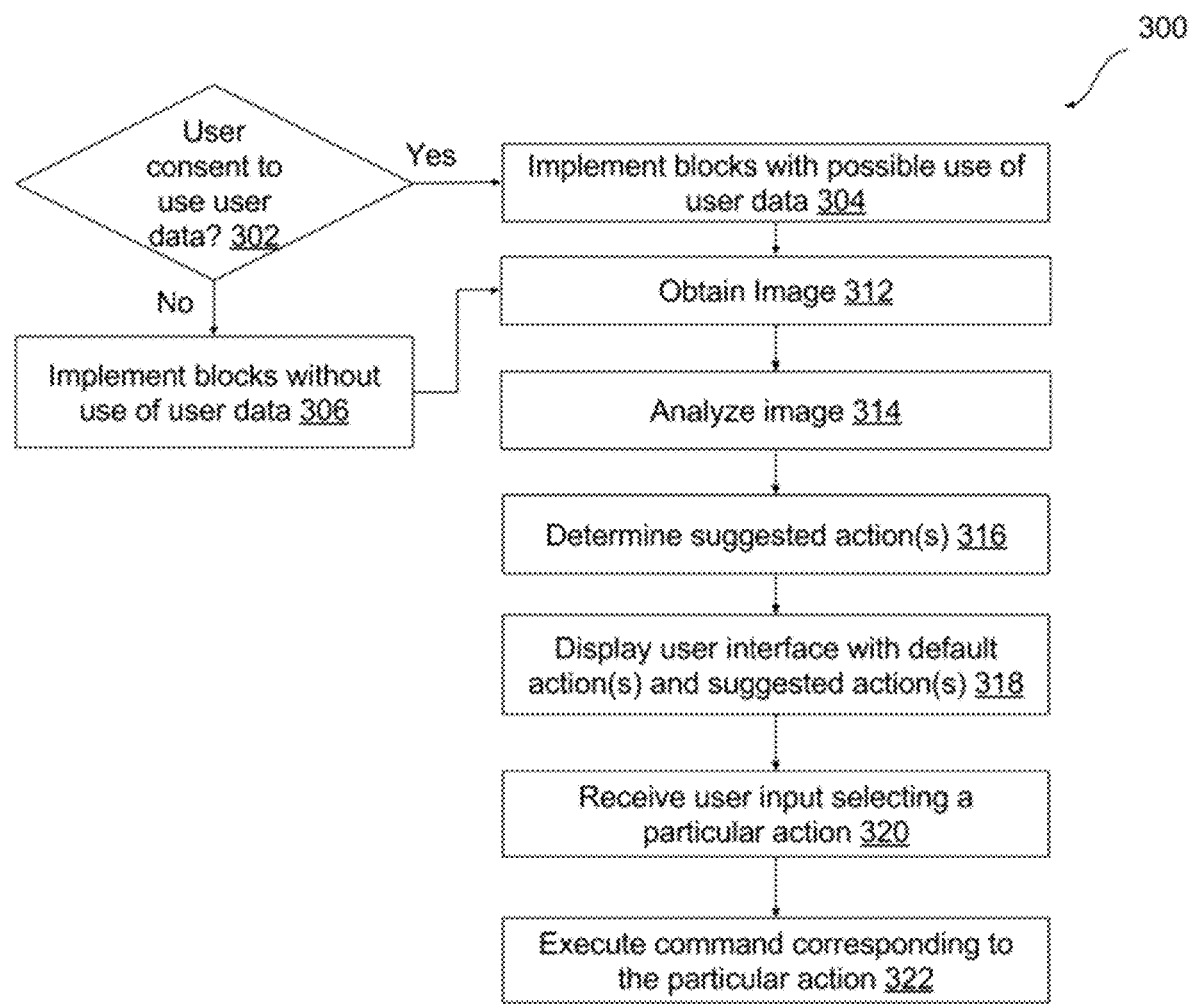
FIG. 3 is a flow diagram illustrating an example method to display suggested actions and execute commands, according to some implementations.

FIG. 3 is a flow diagram illustrating one example of a method 300 to display suggested actions and execute commands, according to some implementations. In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In block 302, it is checked whether user consent (e.g., user permission) has been obtained to use user data in the implementation of method 300. For example, user data can include images captured by a user using a client devices, images stored or accessed by a user, e.g., using a client device, image metadata, user data related to use of a messaging application, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 300, then in block 304, it is determined that the blocks of the methods herein can be implemented with possible use of user data as described for those blocks, and the method continues to block 312. If user consent has not been obtained, it is determined in block 306 that blocks are to be implemented without use of user data, and the method continues to block 312. In some implementations, if user consent has not been obtained, blocks are implemented without use of user data and with synthetic data and/or generic or publicly-accessible and publicly-usable data. In some implementations, if user consent has not been obtained, method 300 is not performed.

In block 312, an image is obtained. For example, the image may be captured by a user, e.g., user U1 of client device 120, using a camera of client device 120. In some implementations obtaining the image may include detecting that the image has been captured based on detecting activation of a camera of a client device, e.g., activation of an image sensor of the client device. In some implementations, obtaining the image may include receiving a notification from an operating system of the client device that the image has been written to a local memory of the client device. In some implementations, the image may be obtained upon detection that an image has been captured. For example, the image may be obtained from a sensor (e.g., an image sensor) that captures the image or a storage device (e.g., a local memory used to write image data). In some implementations, the image (e.g., pixel values) may be obtained from the image sensor, e.g., prior to a user triggering capture of the image, e.g., by activating an image capture button. These implementations may provide a technical benefit that the image can be analyzed prior to user-triggered capture. In these implementations, one or more suggested actions can be determined in parallel with the image capture, therefore enabling suggested actions to be provided to the user with no or low latency. In some implementations, obtaining the image may be triggered based on a notification or indication from an operating system or other application (e.g., an assistant application, an in-memory service that detects that image capture has been activated, etc.). In another example, the image may be obtained, e.g., received over a network with a messaging application (e.g., chat), by e-mail, downloaded from a website, via an image gallery application, via an image management application, etc. The method proceeds to block 314.

In block 314, the image is analyzed, e.g., using one or more image classifiers. For example, the image may be analyzed using method 200 described with reference to FIG. 2. In some implementations, image analysis may include determining one or more categories for the image. In some implementations, analyzing the image may also include determining one or parameters, e.g., based on extracting text from the image. In some implementations, different parameters may be determined based distinct portions of the image. For example, if the image analysis identifies a first portion of the image that includes a first media item (e.g., a compact disc cover) and a second portion of the image that includes a different media item (e.g., a book, a different CD cover, etc.), parameters may be provided based on one or more of the different portions.

In some implementations, block 314 may be implemented using method 200. The method proceeds to block 316. In block 316, one or more suggested actions are determined for the image. In some implementations, the one or more suggested actions for the image are determined, e.g., by a client device that implements suggestion application 158a and/or a server device that implements suggestion application 158b. In some implementations, the one or more suggested actions may be based on the determined categories for the image, image metadata, user context, etc. when permitted by the user. In various implementations, the suggested actions may be associated with a command (e.g., for an application that implements method 300, or other applications on a device that implements method 300.

For example, if it is determined that the image is a document, a suggested action may be to store the image in an image group (e.g., in an image album) for documents in an image gallery application. In another example, if it is determined that the image includes a bill and if the user consents to access of payment information (e.g., bank information, credit card information, etc.) and a payment application, a suggested action may be to pay the bill with the payment application using the payment information. In this example, extracted text from OCR techniques as described with reference to block 206 and one or more image features (e.g., determined using a local classifier or a server classifier), may be utilized to determine the merchant name, the amount due, the payment application to be used to pay the bill, etc. For example, image classifiers may detect the presence of a logo associated with the merchant, or other image features that are utilized to identify the merchant.

In another example, if the image includes a receipt, and if the client device is configured with an expense tracking application, the suggested action may be to extracted information, e.g., merchant name, a location, a price (e.g., amount spent), a timestamp (e.g., date and time of the receipt, etc.), one or more item names of purchased items, etc. in the expense tracking application. In yet another example, if the image includes a link to an online article (e.g., a URL, a barcode, etc.), the suggested action may be to display the article using a browser application.

In another example, if it is determined that the image includes a media cover, a media item corresponding to the media cover (e.g., a music album, a book, a movie, etc.) may be determined. In this example, the suggested actions may include adding the media item to a wishlist (e.g., "books to buy," "Summer reading list," "movies to watch," etc.) for a media rental or purchase application, adding the media item to a stored playlist, e.g., a list of media items such as songs, movies, audiobooks, etc. for a media playback application, purchasing the media item, e.g. in physical form from an e-commerce provider, or in digital form from on online media store using the payment information, etc.

In another example, a suggested action may be to "archive" the image, e.g., such that the image is removed from a view (e.g., a chronological view) that includes images for a user. For example, the suggested action to archive may be shown for an image that is determined to be a duplicate, e.g., identical or very similar, of another image in the view.

In another example, when users permit use of user data, the suggested action to archive an image may be displayed based on other suggested actions for the image, e.g., suggested actions that were displayed a previous time the image was displayed for viewing. For example, if the image is a coupon and a suggestion to use the coupon (e.g., in a shopping application) was previously shown, it may be determined based on user data that the user has not used the coupon (e.g., not selected the suggested action). At a subsequent time that the user views the image, a suggested action may be to archive the image. In some implementations, the suggested action may be different at different times of viewing the image, e.g., based on a time-sensitive parameter (e.g., expiry date of a coupon, due date of a bill, etc.) determined from the image.

In some implementations, if the users consent to use of interaction data regarding use of suggested actions (e.g., the types of suggested actions are selected often, or recently, the types of suggested actions that are not selected, etc.), such data may be utilized to trigger suggested actions. For example, if interaction data indicates that a user typically (or frequently, e.g., meeting a threshold frequency) selects "add to contacts" or "call phone number" suggested actions for images of business cards, and does not select (or selects infrequently) "send e-mail" suggested action, the "send e-mail" may not be displayed to such a user.

In some implementations, the application for a suggested action may be a preconfigured application determined based on different image categories, or may be a user-specified destination for certain image categories. For example, a client device may include features (e.g., provided by an operating system of the client device) to indicate default applications that handle various types of data. For example, such features may be part of a registry of applications, e.g., maintained by an operating system of the client device, or by a suggestion application. In another example, applications may declare (e.g., at a time of installation on a client device) various operations that can the application can perform, various types of data or parameters that the application can handle, etc. In yet another example, a server may provide information (e.g., application information) that indicates various applications that can be utilized for suggested actions corresponding to specific image categories, determined parameters, and image features.

For example, a contacts application, e.g., on a mobile device, may indicate that it can store phone numbers, e-mail address, physical addresses, social media addresses, etc. In this example, if it is determined that the image category is contact (e.g., when the image includes a business card, the image is of a document that includes contact information, etc.), the suggested action may be to invoke the contacts application. Continuing with the example where the image category is contact, a dialer application, e.g., on a mobile phone, may indicate that it can call a phone number (e.g., via a telephony network) or a social media address (e.g., via a call placed through a messaging application). In this example, if it is determined that the image category is contact and the extracted text includes a phone number or a social media address, the suggested action may be to place a call to the number or the social media address via the dialer application.

In some implementations, an application that implements method 300 may also be the application for which the action is suggested. For example, if the user permits use of facial recognition techniques (e.g., as part of analyzing the image), it may be detected that the image includes one or more recognized faces. In this example, the suggested action may be to associate one or more tags that identify a person whose face was recognized in the image. Further, another suggested action may be to share the image with the persons whose faces were recognized (e.g., over a communication network). In various implementations, sharing may be direct sharing (e.g., through the application that implements method 300, such as an image gallery application) or sharing through another application (e.g., a messaging application, an e-mail application, photos application, a file transfer application, etc.) that supports sharing. In some implementations, where data regarding images shared between multiple users is permitted for use in determination of shared actions, a suggested action may be to share the image with another user that has previously shared images with the user, e.g., based on a determination that the one or more of the previously shared images were taken at a same time/location as the image.

In another example, e.g., when method 300 is implemented as part of a camera application, the suggested action may include, e.g., performing automatic enhancements (e.g., color correction, adjusting one or more image properties such as brightness, contrast, etc.) on the image where the enhancements are determined based on analyzing the image, applying one or more image effects based on analyzing the image (e.g., based on detecting that the image has a human face, performing red-eye correction), etc.

In various implementations, the suggested action may be associated with one or parameters determined based on the image, e.g., e-mail addresses, recognized faces, recognized objects or landmarks, etc. In some implementations, the suggested action may correspond to executing a browser application on the device with the one or more parameters. For example, in response to recognizing that the image includes a landmark (e.g., Bryce Canyon, Eiffel Tower, etc.), a suggested action may be to execute the browser application to access an information resource that provides information about the landmark. In another example, in response to recognizing that the image includes an item for purchase (e.g., shoes of a particular brand), the suggested action may be to execute the browser application to access an online shopping portal or marketplace for that item. In some implementations, the online shopping portal may be selected based on one or more criteria. For example, it may be determined that a particular shopping portal offers the item at a lowest price. In response to this determination, the particular shopping portal may be included in the suggested action. In some implementations, other factors related to shopping such as shipping costs, warranty, seller ratings, etc. may also be used to determine the particular shopping portal to include in the suggested action. In some implementations, the online shopping portal may be selected because it provides the best deal for particular items and thereby facilitates efficient user shopping. In various implementations, the best deal may be based on factors such as price, shipping costs, availability, warranty, reviews, item type, etc. In some implementations, where users permit access to user data related to shopping, the particular shopping portal may be determined based on recent shopping activity, membership in a shopper's club, etc. In some implementations, where users permit access to user data related to shopping, the particular shopping portal may be determined based on frequency of shopping activity at a particular shopping portal (e.g., number of purchases made over a period of time).

In some implementations, users may be provided with options to indicate one or more applications for suggested actions. For example, users may indicate specific media playback application, shopping application, payment application, etc. These applications may be prioritized for suggestions actions, e.g., over other applications that also correspond to the image category, determined parameters, and image features. When two or more distinct portions of the image are detected in image analysis, suggested actions may include different actions, each determined based on a particular portion of the two or more distinct portions. The method proceeds to block 318.

In block 318, a user interface is caused to be displayed. For example, the user interface may be displayed by any of client devices 120-124. In some implementations, the user interface includes a plurality of first user interface elements (e.g., on-screen buttons, voice prompts, etc.) that are displayed. Each of the plurality of first user interface elements corresponds to a respective default action of one or more default actions. For example, the default actions may be displayed independent of results of the image analysis performed in block 314 and suggested actions determined in block 316. For example, the one or more default actions may include sharing the image (e.g., via a messaging application, an e-mail application, a social network, etc.), archiving the image (e.g., storing the image in an image library), and performing a visual search (e.g., an image-based search using a search engine) based on the image. The plurality of first user interface elements are displayed irrespective of whether the image analysis was performed, or whether one or more suggested actions are determined. For example, if the image analysis does not result in identifying a category for the image, or if no suggested actions are determined, the plurality of first user interface elements are displayed.

In some implementations, when one or more suggested actions are determined, one or more second user interface elements (e.g., on-screen buttons, voice prompts, etc.) may be included in the user interface. For example, each of the one or more second user interface elements may correspond to a respective suggested action, e.g., when one or more suggested actions are determined. The user interface is configured to permit selection of a particular action from the one or more default actions and the one or more suggested actions. The method proceeds to block 320.

In block 320, user input indicative of selection of a particular action from the one or more default actions and the one or more suggested actions is received. For example, user input may be received based on detecting a gesture, e.g., tapping, swiping, etc. with a touchscreen display of a client device that corresponds to activation of one or more of the first user interface elements and the second user interface elements. While the foregoing example refers to a visual display of user interface elements and selection through a touchscreen, it may be understood that user interface elements may be provided as voice prompts, or using other techniques. Further, user input may be received, e.g. as voice input, touch input, user gesture input, device movement input, device orientation input, etc. based on the particular implementation. The method proceeds to block 322.

In block 322, a particular command corresponding the particular action (from the default actions or the suggested actions) is executed in response to receiving the user selection. In various implementations, a default action may be executed without a parameter. For example, if the user selects the default action of "sharing the image," a menu of sharing options (e.g., share via e-mail, share via messaging application, share via social network, etc.) may be displayed.

In some implementations, a suggested action may be performed by a command to invoke an application corresponding to a suggested action, where the application is invoked with one or more parameters determined based on the image. In various implementations, invoking the application may include making an application programming interface (API) call to the application, using a deep link for the application (e.g., to specific functionality of the application), invoking a web browser to access a particular resource at a website, etc. For example, if the suggested action that the user selected is to place a phone call, a command may be sent to a dialer application to place the phone call, including a parameter (e.g., a phone number) determined based on the image. In another example, if the suggested action that the user selected is to add a contact to a contacts application (e.g., an address book), a command may be executed, e.g., by the contacts application with parameters such as name, physical address, phone number, e-mail address, social media address, etc. The parameters may be based on the image, e.g., when the image includes a business card. In another example, the image may include handwritten text that specifies a name of a wireless network, along with credentials (e.g., a wireless network key) to connect to the wireless network. In this example, executing the command may include connecting to the wireless network of the name determined from the handwritten text using the credentials.

In some implementations, users may select multiple actions, e.g., sequentially. For example, a user may select a suggested action to add a contact, followed by a different suggested action to place a phone call to a phone number that is determined based on the image. In some implementations, the user interface may be updated, e.g., to remove a particular suggested action, if the action has already been completed.

In some implementations, e.g., where the available resources (e.g., screen space—in a wearable device or head mounted display, or other small screen device) for displaying actions are limited, a subset of suggested actions determined in block 316 may be displayed. For example, the subset may be selected based on a confidence score associated with the suggested action. A suggested action may be associated with a higher confidence score, e.g., when the image category is determined with high confidence. Further, when user permits access to user data, such as data about prior actions selected by the user, or use of one or more applications by the user, a suggested action may be associated with a higher confidence based on such user data.

For example, if the user data indicates that the user frequently (e.g., over a threshold number of times) adds a contact to an address book upon obtaining an image of a business card, the suggested action to add the contact to the address book may be assigned a higher confidence score. In some implementations, suggested actions may be ranked based on confidence scores, and the subset of suggested actions may be selected based on the ranks. For example, in some implementations, only those suggested actions are displayed that meet a threshold confidence score, or are of a particular rank (e.g., in the top 3 ranks). In some implementations, when users permit use of user data regarding recent use of a particular type of suggested action, such data may be used to rank the suggested actions. In some implementations, when users permit use of user data regarding a frequency with which a particular type of suggested action, such data may be used to rank the suggested actions.

In some implementations, a threshold may be set for a period of time between obtaining the image in block 312 and displaying the user interface in block 318. For example, the time period may correspond to time elapsed between capture of the image, e.g., by a camera application, and display of the UI. In some implementations, the time period may correspond to one or more other events, e.g., writing the image to a memory, an OS notification of image capture, etc.

In some implementations, e.g., when method 300 is implemented in an application distinct from the camera application, method 300 may be implemented such that the UI is displayed within the threshold, e.g., within 0.5 milliseconds of image capture by the camera application, within 1 milliseconds of image capture by the camera application, etc. such that a user does not perceive a time lag between the image being displayed (e.g., by the camera application) and the UI being displayed (e.g., by a different application that implements method 300). In some implementations, the camera application may display a camera application user interface immediately upon capture of the image. In these implementations, the UI with the default actions and/or suggested actions displayed by the different application may be rendered atop the camera application user interface, e.g., by utilizing draw-on-top functionality provided by an operating system of the device that implements the camera application and the distinct application. For example, such an approach may be advantageous, e.g., when the device is configured with a camera application as a default, and where a separate application, e.g., an image gallery application, displays the user interface that includes the default actions (which may correspond to a command for the image gallery application) and suggested actions (which may correspond to one or more other applications).

In the implementations where a threshold is set, the user interface may be displayed with default actions and no suggested actions, e.g., when a suggested action is not determined within the threshold. Further, suggested actions that are determined within the threshold may be displayed along with the default actions, e.g., at an initial display of the user interface, and additional suggested actions may be added, e.g., inserted into the user interface, at a subsequent time as such suggested actions are determined.

In some implementations, the user interface displayed in block 318 may be a transient user interface, e.g., displayed temporarily (e.g., for 1 second, for 3 seconds, etc.) and may be removed after a limited period of time. Such implementation may be beneficial in providing the user with options to select a particular action from the default actions and the suggested actions, and if the user does not provide selection within the limited period of time, removal of the suggested actions user interface enables the user to continue interacting with the camera application.

In some implementations, different parts of method 300 may be performed on different devices. For example, in some implementations, results from the image analysis performed in block 314, e.g., an image feature vector, or knowledge representation of the image, may be provided to different suggestion applications on different server devices to determine suggested actions. For example, in some implementations, suggestion applications may be implemented by different providers (e.g., grocery stores, online video providers, etc.). In these implementations, each provider may determine a suggested action, and provide the determined suggested action for display. In some implementations, a provider may indicate image features or image categories for which the provider can supply suggested actions.

In another example, in some implementations where a user provides permission to share image data, image data (e.g., pixel values) may be provided to different server devices (e.g., operated by different parties), such that each server device can apply an image classifier to the image and determine suggestions. For example, such an implementation may be advantageous if certain server devices are configured with domain-specific classifiers to recognize specific image features. For example, provider of a shopping website may offer shopping-related suggestions based on an image classifier that is configured to recognize product images, e.g., to identify products that are available from the shopping web site. Suggested actions generated by different server devices may be aggregated and a subset of the determined suggested actions may be included in the user interface.

In some implementations, the determined suggested actions may be determined based in part on user preferences. For example, in these implementations, if a user had previously indicated a preference for a particular contacts application a particular dialer application, etc., the determined suggested actions may be to launch the particular contacts application for images that are detected as business cards. For example, the user preference may be indicated by the user choosing an application as a default application, e.g., in a setting stored by an operating system. In some implementations, the suggested actions are determined automatically, without user input. For example, in implementations where users permit analysis of user data, it may be determined that the user normally utilizes a particular dialer application to place phone calls, and in response, the particular dialer application may be chosen for the determined suggested action, e.g., for an image of a business card.

Figure 4:
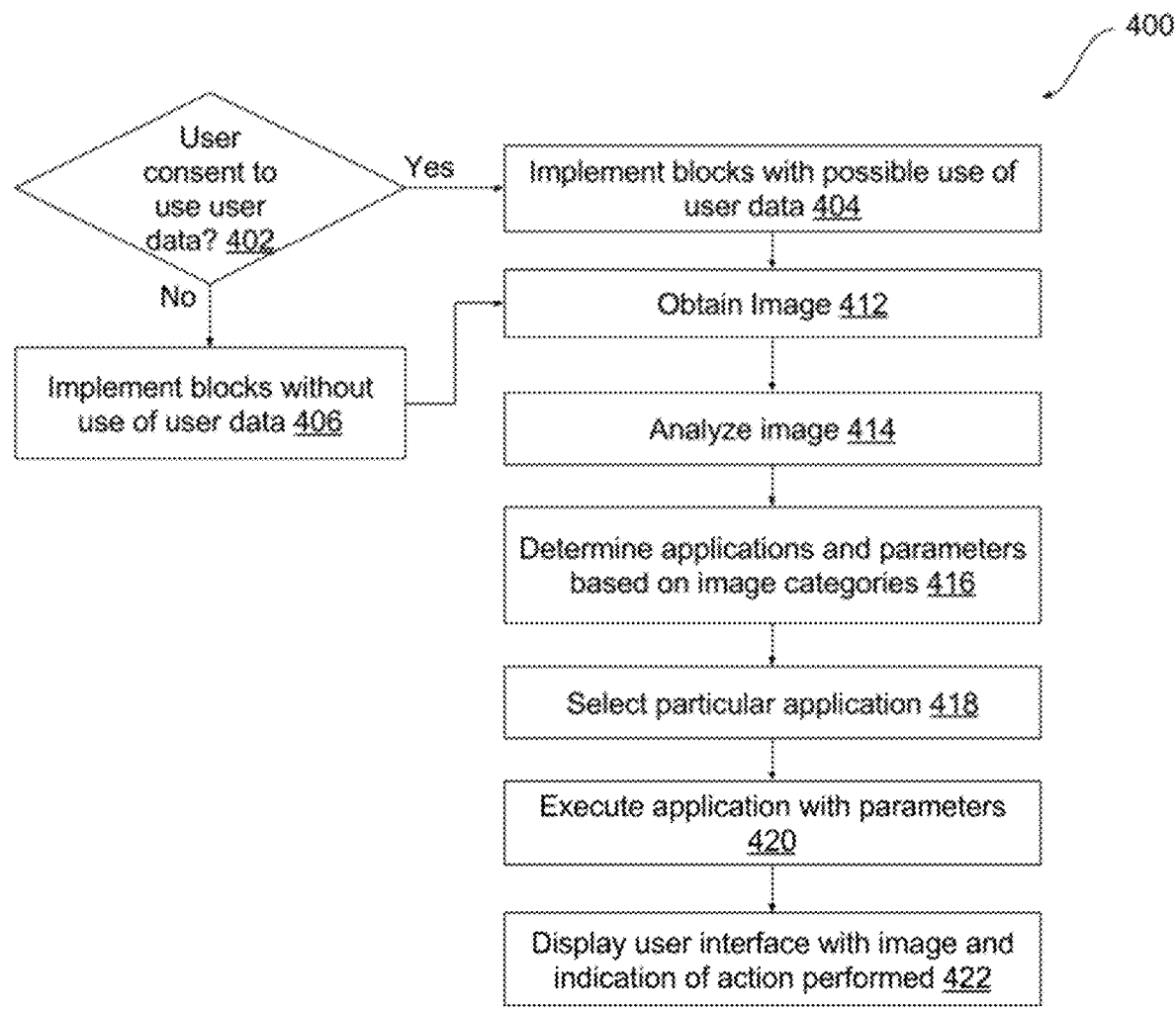
FIG. 4 is a flow diagram illustrating an example method to select and execute an application based on an image, according to some implementations.

FIG. 4 is a flow diagram illustrating one example of a method 400 to select and execute an application based on an image, according to some implementations. In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In block 402, it is checked whether user consent (e.g., user permission) has been obtained to use user data in the implementation of method 400. For example, user data can include images captured by a user using a client devices, images stored or accessed by a user, e.g., using a client device, image metadata, user data related to use of a messaging application, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 400, then in block 404, it is determined that the blocks of the methods herein can be implemented with possible use of user data as described for those blocks, and the method continues to block 412. If user consent has not been obtained, it is determined in block 406 that blocks are to be implemented without use of user data, and the method continues to block 412. In some implementations, if user consent has not been obtained, blocks are implemented without use of user data and with synthetic data and/or generic or publicly-accessible and publicly-usable data. In some implementations, if user consent has not been obtained, method 400 is not performed.

In block 412, an image is obtained. Block 412 is similar to block 312 of method 300. The method proceeds to block 414.

In block 414, the obtained image is analyzed, similar to block 314. For example, one or more image categories may be determined using method 200. The method proceeds to block 416.

In block 416, one or more applications and corresponding parameters are determined, based on the one or more image categories determined in block 414. The applications and parameters may be determined similar to determining one or more suggested actions as described with reference to block 316. For example, one or more applications, e.g., available on a device that implements method 400, may be determined based on image categories, image features, and if permitted by the user, user data. Further, parameters for the applications may be determined based on analyzing the image. In some implementations, parameters may include text or other information extracted from the image. As described with reference to FIG. 3, each of the determined applications may have an associated confidence score. The method proceeds to block 418.

In block 418, a particular application from the applications determined in block 416 is selected. For example, if the image includes a business card, the determined applications may include a contacts application and the parameters determined for the contacts application may include contact information to be added to contacts maintained in the contacts application. The determined applications may further include a dialer application and the parameters may include a phone number extracted from the image. The determined applications may further include an e-mail application and/or a social network application, and the parameters may include an e-mail address or a social media address extracted from the image. In another example, if the image includes a media cover, the parameter may include a title of the corresponding media item (e.g., as indicated on the media cover), e.g., a book title, and the determined applications may include a shopping application, an e-reader application, and a book reviews application.

In some implementations, a user may indicate a particular application, and in some examples, a particular command for that application, as a user preference. For example, a user may indicate a preference to automatically place a call using a dialer application if a phone number is detected within an image, and if no other contact information is detected. In another example, a user may indicate a preference to automatically add contact information using a contacts application, e.g., upon detecting that the image category is business card. In another example, a user may indicate a preference to add media items to a media library of a media playback application, e.g., in a playlist. In some implementations, a user may indicate a preference for multiple actions, e.g., adding the media item to the library and initiating playback of the media item using a media playback application. In these implementations, the particular application may be selected from the determined applications based on the user preference.

In some implementations, when users consent to use of user data (e.g., prior user behavior, usage data of various applications, etc.) user preference may be determined based on user data. For example, it may be determined that a user stores particular categories of images (e.g., identification documents, tickets, receipts, etc.) to particular folders on a device, or in particular image groups within an image library. In response to such determination, the corresponding application may be selected from the determined applications based on the user preference.

In some implementations, applications may be selected based on a confidence score associated with the image, e.g., based on the image analysis to determine image categories and/or parameters. For example, if a relatively higher confidence score is associated with a determination that the image includes a book cover than a confidence score associated with a determination that the image includes a CD cover, an application corresponding to the image category "book cover" may be selected based on the confidence scores.

In some implementations, e.g., when a user preference is not known, cannot be determined, or when the confidence score for the image does not meet an application execution threshold, it may be determined in block 418 that the image no application is to be executed. In some of these implementations, one or more suggested actions may be displayed in a UI as described above with reference to FIG. 3. In some of these implementations, application execution is performed upon specifically receiving a user selection of a suggested action. In these implementations, blocks 420 and 422 may not be performed. If a particular application is selected in block 418, the method proceeds to blocks 420.

In block 420, the particular application is executed, e.g., invoked with one or more parameters determined based on the image. For example, the application may be invoked by executing a command, e.g., making an application programming interface (API) call to the selected application, with the determined parameters. Upon invoking the application, the application may automatically perform one or more actions, e.g., as specified in the API call, without user input. The method proceeds to block 422.

In block 422, upon completion of execution of the application, a user interface may be displayed with the image and an indication of the action performed. For example, if the image is a receipt and the application is an expense tracking application, an indication that details from the receipt, such as merchant name, item name(s), timestamp, price, etc. that were added to the expense tracking application may be included in the user interface. In another example, if the user provides consent for such determination, it may be determined that the image is an identification document, and the particular application may be an application that stores important documents, e.g., a document vault. In this example, the indication may include a type of the document (e.g., driver's license, university ID, etc.), parameters extracted from the document (e.g., a name, an identification number, etc.) that were added to the document vault. In some implementations, the user interface may include one or more elements that indicate that the indicated operation was performed successfully.

Figure 5A:
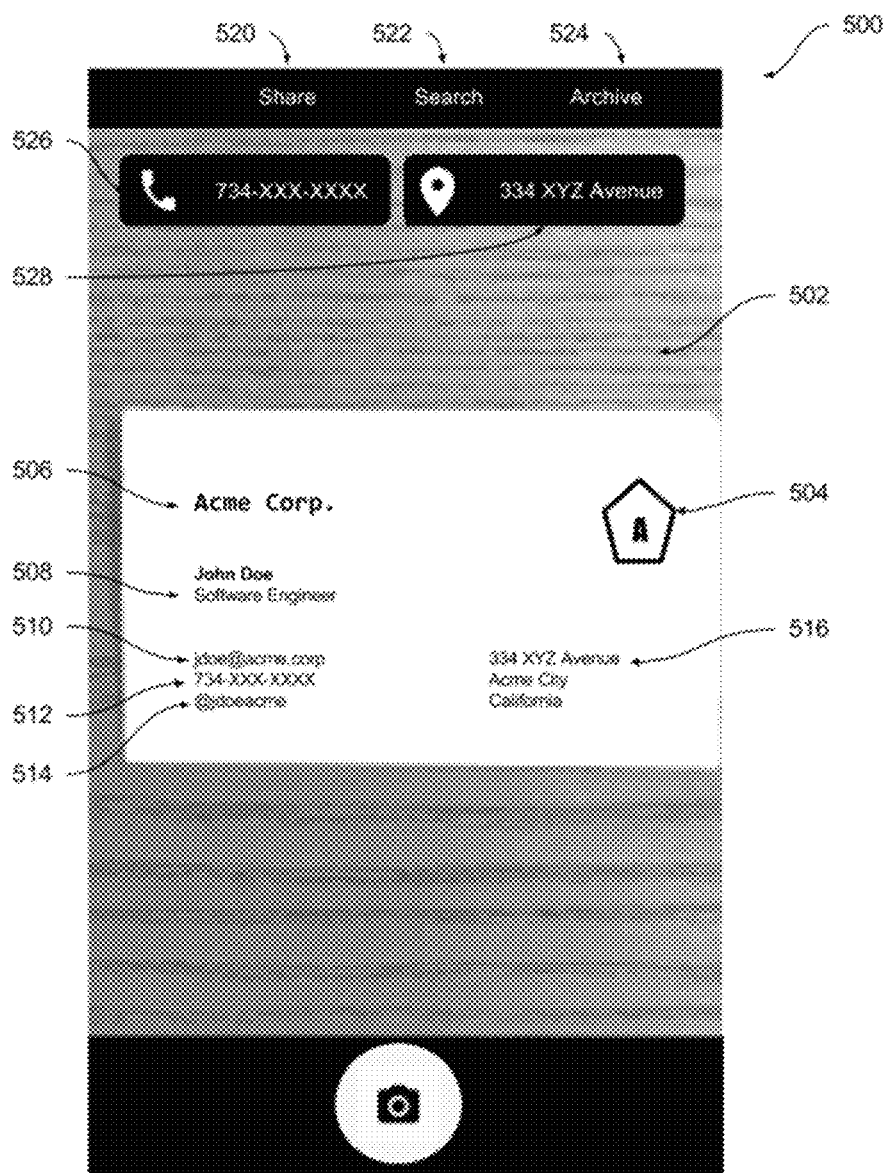
FIG. 5A is a diagrammatic illustration of an example user interface that includes an image with a plurality of default actions and suggested actions, according to some implementations.

FIG. 5A is a diagrammatic illustration of an example user interface 500 that includes an image with a plurality of default actions and suggested actions, according to some implementations. In various implementations, user interface 500 can be displayed by a display device, e.g., by a display screen of a client device 120, 122, 124, and/or 126 of FIG. 1, or a server system 102 in some implementations. In this example, user interface 500 can be displayed by an image gallery application or a camera application (or other application program) running on a device that can obtain images (e.g., via a camera, over a network, etc.).

User interface 500 includes an image 502, e.g., a photo captured using a camera. In the example shown in FIG. 5A, the image includes a business card. As shown in FIG. 5A, upon application of OCR techniques and/or an image classifier, different portions of the image may be recognized. For example, a company logo 504, a company name 506 ("Acme Corp."), a person's name and designation 508 ("John Doe, Software Engineer"), an e-mail address ("jdoe@acme.corp") 510, a phone number 512 ("734-XXX-XXXX"), a social media address 514 ("@jdoesacme"), and a physical address 516 ("334 XYZ Avenue Acme City California") may be recognized from the image. Depending on the individual image, one or more additional features or fewer features may be recognized.

User interface 500 may include a plurality of user interface elements that each correspond to a respective default action. In the example illustrated in FIG. 5A, user interface elements 520 ("Share"), 522 ("Search"), and 524 ("Archive") are included that each correspond to a default action. In various implementations, any number of default actions may be included. In different implementations, additional default actions, e.g., performing a visual search based on the image, performing an automatic enhancement operation on the image, etc. may be included. Each of user interface elements 520-524 may be selectable by the user, e.g., by tapping. Upon receiving user input indicative of selection of a particular default action by the user (e.g., "Search"), a command for the corresponding action may be executed. For example, in response to user selection of user interface element 522, a command may be executed to perform a search based on the image, e.g., a local search on the device that captured image 502, an Internet search, etc.

In some implementations, user interface 500 may also include one or more user interface elements that each correspond to a respective suggested action. In various implementations, the suggested action(s) may be based on the analysis of the image, e.g., image categories, text extracted from the image, an object or landmark recognized in the image, etc. In the example illustrated in FIG. 5A, user interface elements 526 and 528 are shown. User interface element 526 includes text extracted from the image, e.g., the phone number 734-XXX-XXXX and may correspond to a suggested action to place a call to the phone number using a dialer application. If the user indicates selection of user interface element 526, the dialer application may be launched with the phone number as the parameter, e.g., to place a phone call. User interface element 528 includes text extracted from the image, e.g., the address 334 XYZ Avenue.

In FIG. 5A, user interface elements 526 and 528 are displayed based on analyzing the image to identify two distinct portions (e.g., phone number 512 and physical address 516) of the image. The user interface elements 526 and 528 correspond to respective actions two suggested actions. Each suggested action is associated with a respective portion of the image. Upon user input indicative of selection of user interface element 528, a map application may be executed with the address as the parameter, such that the map application launches and provides a search for and display of the location of the address. In some implementations, e.g., if user interface 500 is displayed on a client device that does not include a map application, selection of user interface element 528 may result in a web browser application being launched, with a map website URL and the address as parameters.

While FIG. 5A illustrates suggested actions with reference to a phone number and an address, suggested actions may be based on other information from the image, e.g., e-mail address, social media address, etc. In some implementations, a suggested action may be based on multiple portions of the image, e.g., a suggested action for image 502 may be to add a contact in a contacts application based on the recognized information, e.g., 506-516. While FIG. 5A illustrates two suggested actions, it may be understood that any number of suggested actions may be shown.

In implementations where users permit access to user data, such as user preferences for applications, data regarding prior behavior of users with respect to suggested actions, display of user interface elements for suggested actions may be customized based on such data. For example, if user behavior data indicates that upon capturing an image of a business card, the user selects an "add to contacts" suggested action more frequently for recent images of business cards, e.g., more frequently than "place a phone call," the suggested action to add to contacts may be displayed. In some implementations, suggested actions may be based on image category, e.g., different suggested actions may be shown for "business cards," "receipts," "book covers," etc.

In implementations where users permit use of user preference data for applications, a command for the particular action may be to invoke a user-preferred application. For example, if a device that displays user interface 500 has three different contact management applications available, the command may be executed such that a particular contacts application selected based on user preference data is launched. In some examples, commands may be executed based on default applications for certain types of actions, e.g., a default dialer application for phone calls, a default messaging application for messages, a default e-mail application for e-mail addresses, etc.

Figure 5B:
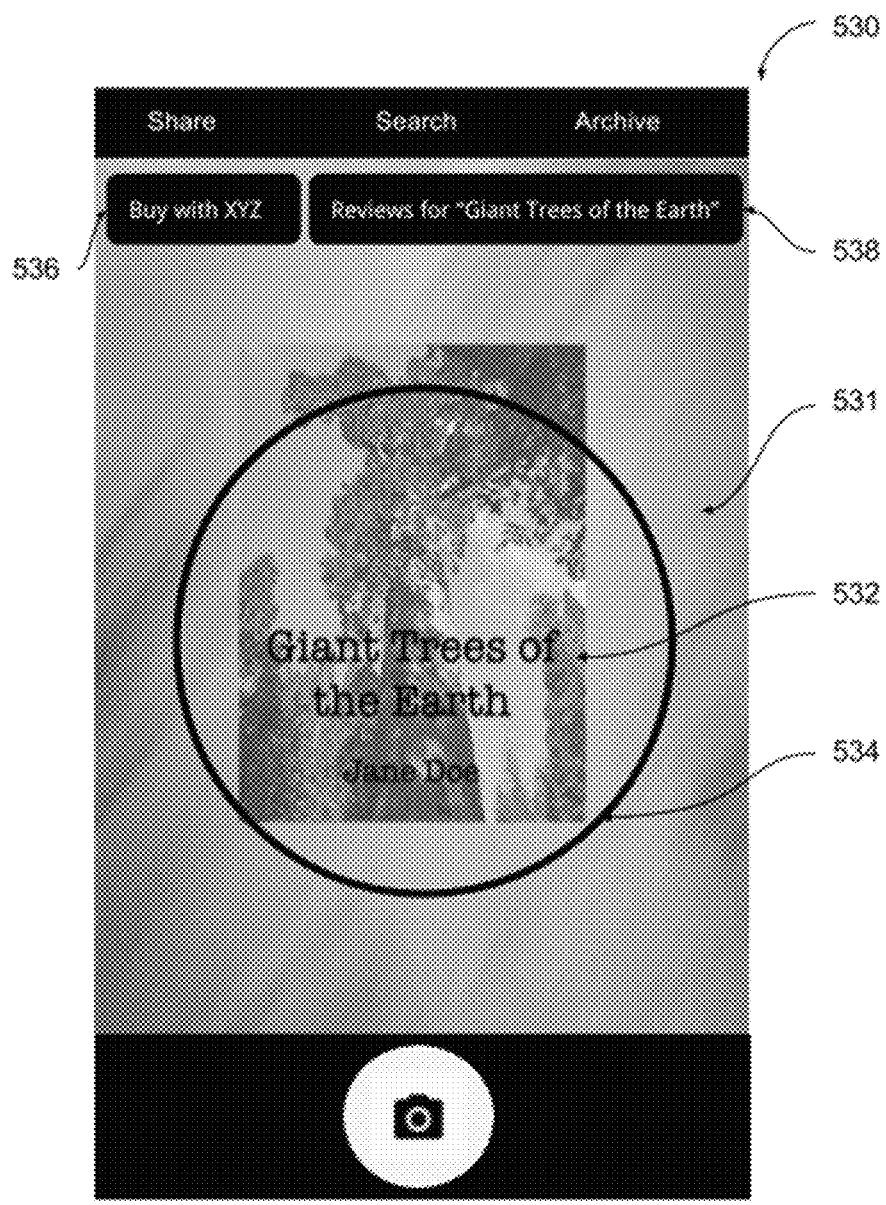
FIG. 5B is a diagrammatic illustration of another example user interface that includes an image with a plurality of default actions and suggested actions, according to some implementations.

FIG. 5B is a diagrammatic illustration of another example user interface 530 that includes an image with a plurality of default actions and suggested actions, according to some implementations. User interface 530 includes an image 531, e.g., a photo captured using a camera. In the example shown in FIG. 5B, the image shows a book against a background. As shown in FIG. 5B, upon application of OCR techniques and/or an image classifier, different portions of the image may be recognized. For example, a book title 532 ("Giant Trees of the Earth") is recognized in image 531. As shown in FIG. 5B, a portion of image 531 may be highlighted in user interface 530, e.g., by circle 534. For example, the portion highlighted may be based on analyzing the image. For example, in FIG. 5B, it may be determined that the portion inside circle 534 is a salient portion of the image, e.g., from which information is extracted based on image analysis. Further, highlighting may be based on determining a category for the image, e.g., book cover. While FIG. 5B shows a single highlighted portion, some images may be displayed with multiple highlighted portions, e.g., an image that includes three books may include three highlighted portions.

FIG. 5B also includes user interface elements 536 ("Buy with XYZ") and 538 ("Reviews for Giant Trees of the Earth"). User interface elements 536 and 538 each correspond to a suggested action, e.g., to purchase the book with an application XYZ (e.g., a shopping application, an e-book application, etc.), to access reviews for the book (e.g., via an application or website that provides book reviews), etc. Upon receiving user input indicative of selection of a particular user interface element, a command to invoke the particular application may be executed.

Figure 5C:
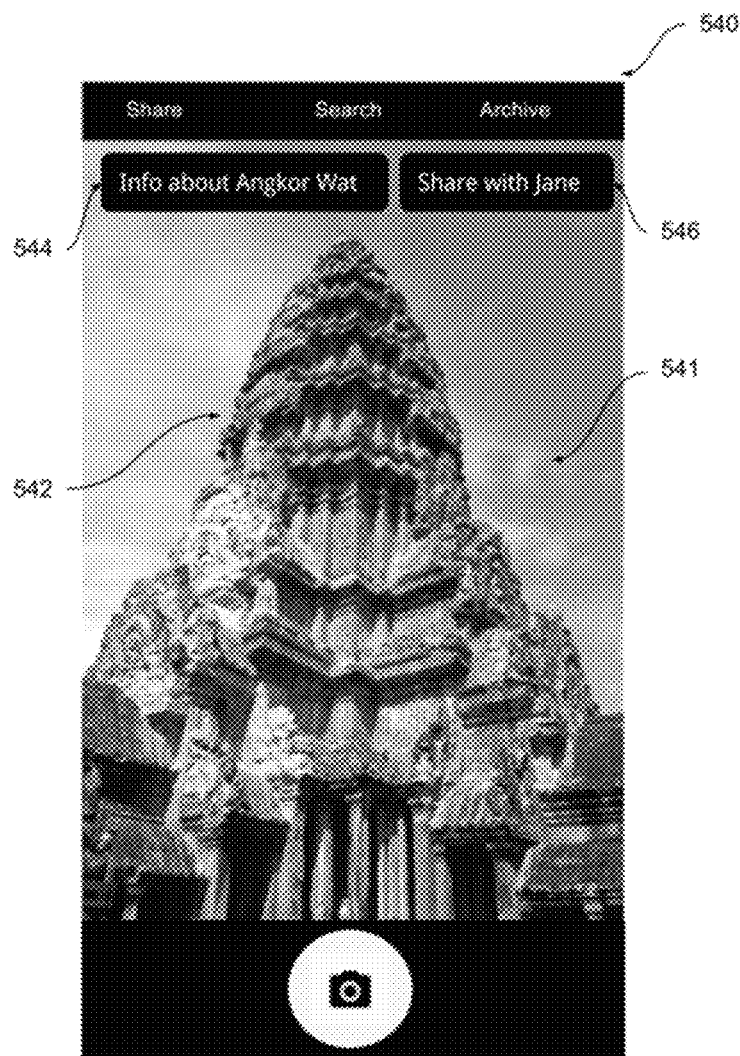
FIG. 5C is a diagrammatic illustration of another example user interface that includes an image with a plurality of default actions and suggested actions, according to some implementations.

FIG. 5C is a diagrammatic illustration of another example user interface 540 that includes an image with a plurality of default actions and suggested actions, according to some implementations. User interface 540 includes an image 541, e.g., a photo captured using a camera. In the example shown in FIG. 5C, the image is a photo of a temple. As shown in FIG. 5C, upon application of OCR techniques and/or an image classifier, the image may be recognized. For example, the temple 542 in image 541 is recognized as "Angkor Wat." Image 541 does not include any text. In this example, determination that the image depicts Angkor Wat may be based on the image classifier recognizing the landmark.

FIG. 5C also shows user interface elements 544 ("Info about Angkor Wat") and 546 ("Share with Jane"). User interface elements 544 and 546 each correspond to a suggested action, e.g., to obtain information about content of the image, e.g., the Angkor Wat temple from an encyclopedia application, a search engine, etc., to share the image with a friend (Jane) using an image sharing application, a messaging application, etc. While FIG. 5C includes a default action "Share," the user interface element 546 suggested action "Share with Jane" may be included. For example, if the user permits access to prior sharing data, it may be determined that one or more other pictures from the trip to Angkor Wat were previously shared with Jane, that the user frequently shares pictures with Jane, that Jane has recently shared pictures with the user, etc. Based on such determination, the user interface element 546 is included in the user interface 540. In some implementations, other information permitted for use by the user, e.g., social graph information that indicates a relationship between the user and one or more connected users in the social graph, user profile information, etc. may be used to determine one or more suggested actions.

Figure 6:
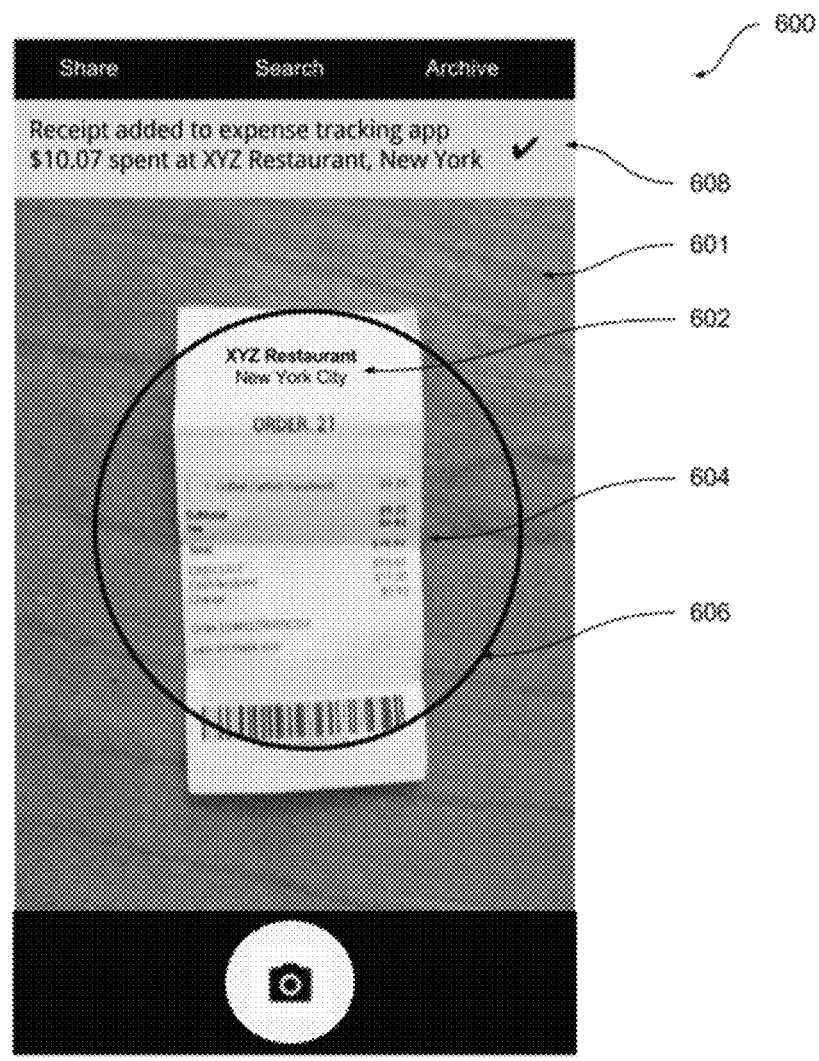
FIG. 6 is a diagrammatic illustration of an example user interface that includes an image and an indication that than an action was performed, according to some implementations.

FIG. 6 is a diagrammatic illustration of an example user interface 600 that includes an image and an indication that than an action was performed, according to some implementations. User interface 600 includes an image 601, e.g., a photo captured using a camera. In the example shown in FIG. 6, the image is a photo of a receipt. As shown in FIG. 6, upon application of OCR techniques and/or an image classifier, one or more portions in the image may be recognized. For example, a restaurant name 602 ("XYZ Restaurant") and an amount 604 ("$10.07") is recognized in image 601. Based on analyzing image 601, the image category may be determined to be receipt. In the implementation shown in FIG. 6, a portion 606 of the image is highlighted to indicate that the image includes a receipt and that the portion 606 includes the receipt.

FIG. 6 also includes an indication 608 that indicates an action was performed for the image. For example, indication 608 includes an image category ("receipt"), one or more parameters determined based on the image and used to perform the action (e.g., "$10.07," "XYZ Restaurant, New York"). Further, indication 608 also includes an application ("expense tracking app") that was used to perform the action. In different implementations, the indication may include additional information (e.g., a date/time of the receipt, a payment method such as cash or credit card, etc.), or may include less information. Indication 608 may notify the user that image 601 was recognized as a receipt and that without further user input, information extracted from image 601 was automatically added to the expense tracking application. In some implementations, the action may be performed for certain categories, e.g., user-specified categories, and not performed for other categories. In some implementations, the action may be performed only if certain parameters for the action are recognized. In some implementations, actions may be performed automatically, e.g., based on a user indicating "always perform this action," e.g., after selecting a suggested action.

Figure 7:
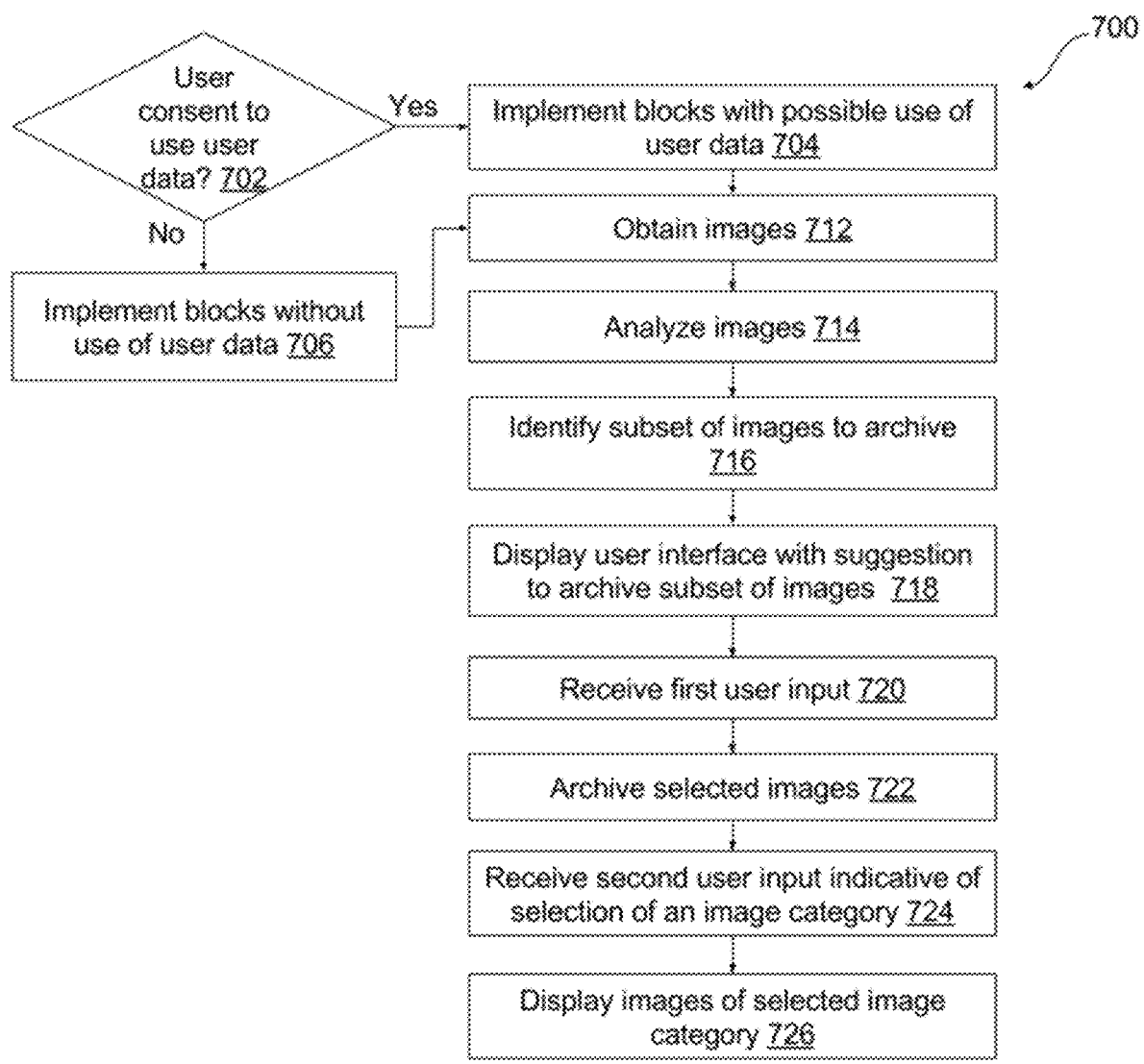
FIG. 7 is a flow diagram illustrating an example method to archive images, according to some implementations.

FIG. 7 is a flow diagram illustrating one example of a method 700 to archive images, according to some implementations. In some implementations, method 700 can be implemented, for example, on a server system 102 as shown in FIG. 1. In some implementations, some or all of the method 700 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In block 702, it is checked whether user consent (e.g., user permission) has been obtained to use user data in the implementation of method 700. For example, user data can include images captured by a user using a client devices, images stored or accessed by a user, e.g., using a client device, image metadata, user data related to use of a messaging application, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 700, then in block 704, it is determined that the blocks of the methods herein can be implemented with possible use of user data as described for those blocks, and the method continues to block 712. If user consent has not been obtained, it is determined in block 706 that blocks are to be implemented without use of user data, and the method continues to block 712. In some implementations, if user consent has not been obtained, blocks are implemented without use of user data and with synthetic data and/or generic or publicly-accessible and publicly-usable data. In some implementations, if user consent has not been obtained, method 400 is not performed.

In block 712, an image is obtained. Block 712 is similar to block 312 of method 300. The method proceeds to block 714.

In block 714, the obtained images are analyzed, similar to block 314. In some implementations, one or more image categories may be determined for the images, using method 200. The method proceeds to block 716. For example, image analysis may include determining one or more categories for the obtained images. In some implementations, metadata of the selected images may be updated, e.g., to indicate the image categories for the image. In some implementations, metadata of the selected images may indicate whether the image has been archived. In some implementations, image identifiers corresponding to the images and the one or more categories determined for the images are stored in a database.

In block 716, a subset of images from the obtained images is identified for archival. In some implementations, the subset of images may include images that are categorized as documents (e.g., receipts, bills, coupons, menus, business cards, whiteboards, newspapers, etc.), memes (e.g., images received via a messaging application that depict a commonly shared image, e.g., a humorous image, an image with a greeting (e.g., "Good morning") etc., and screenshots. In some examples, the subset of images may include images that are categorized as bad photographs, e.g., photographs that are determined to be blurry or out of focus, underexposed, or taken inadvertently.

In some implementations, if the user permits use of user data such as contextual data, such data may also be used to identify the subset of images. For example, if user data indicates that a user takes multiple photographs of a scene, and subsequently, performs image editing operations on only one of the multiple photographs, other photographs that were not edited may be included in the subset of images identified for archival. In some implementations, if user provides consent to access sharing data, images that are shared may be excluded from the subset of images, even when such images are in categories identified for archival. The method proceeds to block 718.

In block 718, a user interface is caused to be displayed. For example, the user interface may be displayed by any of client device 120-124. In some implementations, the user interface includes one or more images from the subset of images. In some implementations, the user interface may be displayed as a card, e.g., a suggestion card, with a suggestion to archive images from the subset of images. For example, a suggestion card may be based on a user interface that specifies the presentation various types of information and/or provides user-selectable options in a concise manner. For example, a suggestion card can be dismissed by a user, and may remain available in an archive of suggestion cards (e.g., in a portion of the user interface) for the user to access at a later time. In some implementations, a suggestion card template may specify triggering events (e.g., dates, times, context, etc.). If user permits access to context data (e.g., user activity data), the suggestion card may be triggered according to the template based on the context data.

In some implementations, the user interface may be displayed based on the subset of images. For example, the user interface may not be displayed, e.g., if the subset of images has few images, e.g., less than 5 images, less than 7 images, etc. In another example, the user interface may not be displayed if the subset of images includes only recent images, e.g., images captured within the past week, images captured within the previous month, etc. In some implementations, the user interface may be displayed more frequently, e.g., when it is determined that the subset of images includes a large number of images, e.g., 50 images, such as when a large number of duplicate images are captured or when the user receives a large number images that are memes, etc. In some implementations, the user interface may be displayed periodically, e.g., once a week, once a month, etc. The method proceeds to block 720.

In block 720, first user input is received. The first user input indicates that selected images (e.g., one or more images of the subset of images) are to be archived. In some implementations, the user interface may permit the user to deselect one or more images, and/or select additional images from the obtained images, e.g., prior to archival. The method proceeds to block 722.

In block 722, the selected images are removed from a displayed view that includes the obtained images. In some implementations, the displayed view is a portion or entirety of a display screen or other display area, which displays the obtained images or a subset thereof. In some implementations, the displayed view includes all the obtained images, even though a subset of the obtained images may be actually displayed on a display device at one time. For example, in some implementations, a subset of the obtained images included in the view is displayed at one time, and images of the obtained images outside the subset may be displayed by the view, e.g., by causing one or more of the previously-displayed images to be positioned out of a boundary of the view (e.g., via scrolling or page-flipping directed by user input, etc.). In some examples, the displayed view can be a chronological view of the images, e.g., based on time of capture of the images (or other time associated with the images).

In an example, the selected images can be removed from the set of obtained images that are included in the displayed view, e.g., the selected images are not available for display in the displayed view and, e.g., are not displayed within the borders of the displayed view by a display device. In some implementations, metadata for the selected images may be updated to indicate that the selected images are archived. In some implementations, the metadata can be stored in conjunction with the selected image data, and/or can be stored separately in associated with the respective selected images. In some implementations, a database may be identified to store an "archived" in one or more database records corresponding to the selected images. The method proceeds to block 724.

In block 724, second user input may be received. For example, the user interface may enable a user to provide second input that is indicative of selection of a particular image category. Upon receiving the second user input, a database lookup is performed to identify one or more images for the particular category. In some implementations, image metadata may be looked up to identify the one or more images for the particular category. The method proceeds to block 726.

In block 726, one or more images of the particular category as identified in block 724 may be displayed. For example, if the second user input indicates selection of image category "receipts," one or more images that are categorized are receipts (e.g., in block 714) may be displayed.

Figure 8A:
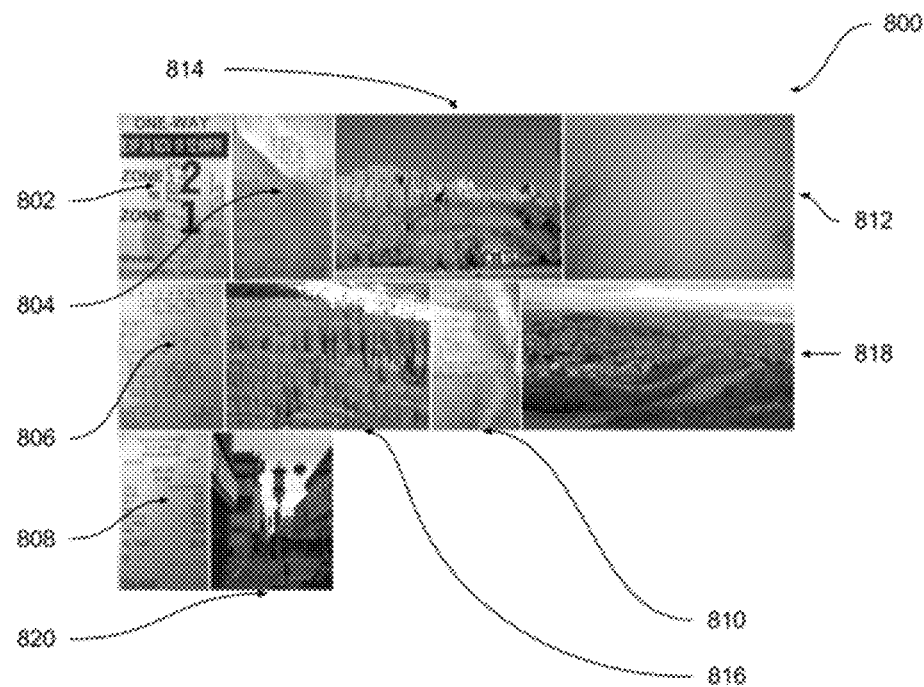
FIG. 8A is a diagrammatic illustration of an example user interface, according to some implementations.

FIG. 8A is a diagrammatic illustration of an example user interface 800 that includes a plurality of images. For example, user interface 800 may be displayed by an application on a client device (e.g., any of client devices 120-124) or provided by a server application for display on a client device. For example, the application that displays user interface 800 may be an image management application, an image gallery application, a photos application, etc.

User interface 800 includes images 802-820. In some implementations, images 802-820 may be ordered chronologically, e.g., in a descending order of a time of creation (e.g., time of capture by a camera, time the image was received, etc.). Images 802-820 may be any type of image, e.g., a photograph, an animated GIF file, a video, etc. For example, any of images 802-820 may be captured by a user using a camera of a client device. In another example, any of images 802-820 may be received over a network, e.g., via e-mail, via a messaging application, etc. In some implementations, images 802-820 may be stored in a client device, a server device, or both a client device and a server device.

In some implementations, it may be determined, e.g., using method 700, that one or more images are associated with categories that are suitable for archival. For example, such categories may include documents (e.g., receipts, bills, coupons, menus, business cards, whiteboards, newspapers, etc.), memes (e.g., images received via a messaging application that depict a commonly shared image, e.g., a humorous image, an image with a greeting (e.g., "Good morning") etc., and screenshots. In some examples, such categories may also include bad photographs, e.g., photographs that are determined to be blurry or out of focus, underexposed, or taken inadvertently.

Other categories of images, e.g., photographs, videos, etc. may not be suitable for archival. For examples, image 802-812 as shown in FIG. 8A may be associated with categories that are suitable for archival, e.g., receipts, documents, bad photographs, etc. For example, image 802 may be categorized as "ticket," images 804, 806, 808, and 810 may be categorized as "receipt," and image 812 may be categorized as "bad photo." Images 814-820 may be categorized as "photos" and as not suitable for archival. Images 802-812 may be in a subset of images to archive.

Figure 8B:
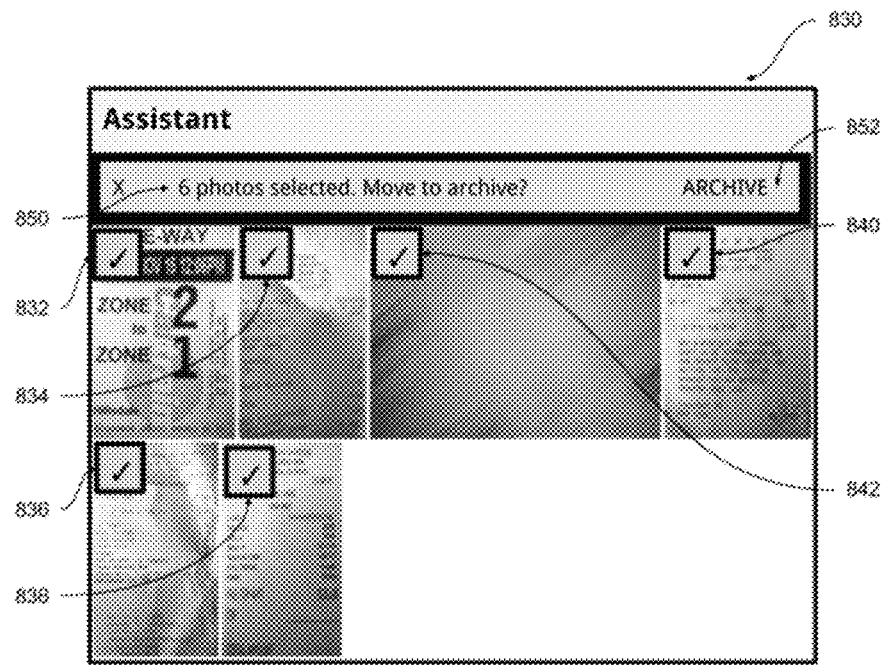
FIG. 8B is a diagrammatic illustration of another example user interface, according to some implementations.

FIG. 8B is a diagrammatic illustration of an example user interface 830 that includes a suggestion card to archive a subset of images from the plurality of images shown in FIG. 8A, e.g., images 802-812. As shown in FIG. 8B, images (e.g., images 802-812 as shown in FIG. 8A, numerals omitted from FIG. 8B) may be selected based on the respective associated categories, as indicated by user interface elements 832-842. In some implementations, some images may be shown in a modified form, e.g., tinted. For example, images categorized as screenshots may be shown with a tint, e.g., to distinguish from user interface of the application that displays the images. In some implementations, images categorized as screen shots may be shown with dotted lines around them, shown in a different size, shown with an animation (e.g., oscillating), etc. to provide such distinction.

User interface 830 further includes text 850 ("6 photos selected. Move to archive?") that provides a suggestion to a user to archive the selected images. User interface element 830 further includes a button 852 ("ARCHIVE") that is configured to receive user input. In some implementations, user interface elements 832-842 may be selectable such that a user can omit one or more images from the images selected for archival. Upon receiving user selection of button 852, the selected images may be archived. Archived images may be stored such that the images do not appear in a chronological or other view of images.

In some implementations, archived images may be retained, e.g., by a server device, and removed from a client device. Archived images may remain accessible by the user, e.g., via search, via an "archived images" folder, or in image groups that correspond to various image categories, e.g., "receipts," "tickets," etc. In some implementations, e.g., if a user indicates a preference, archived images may be deleted from storage and may not be accessible to the user after deletion. In some implementations, one or more selected images (e.g., images categorized as bad photos) may be deleted after archiving.

Figure 8C:
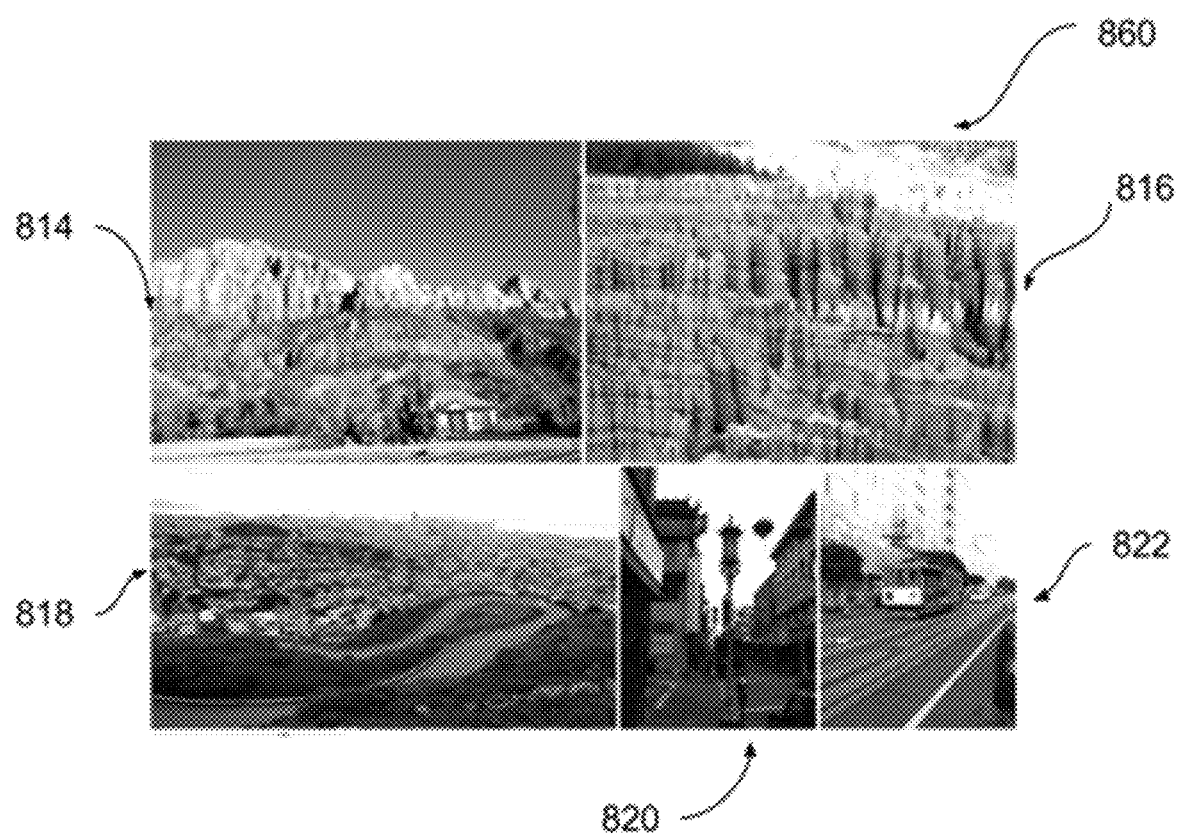
FIG. 8C is a diagrammatic illustration of another example user interface, according to some implementations.

FIG. 8C is a diagrammatic illustration of an example user interface 860 that may be displayed after a user has archived the subset of images as shown in FIG. 8B. Images 802-812 of FIG. 8A that were archived (e.g., based on user input indicative of selection of "ARCHIVE") are no longer included in the user interface, as shown in FIG. 8C, and an image 822 is included (e.g., that was previously not shown, e.g., due to constraints of available screen space).

Figure 9:
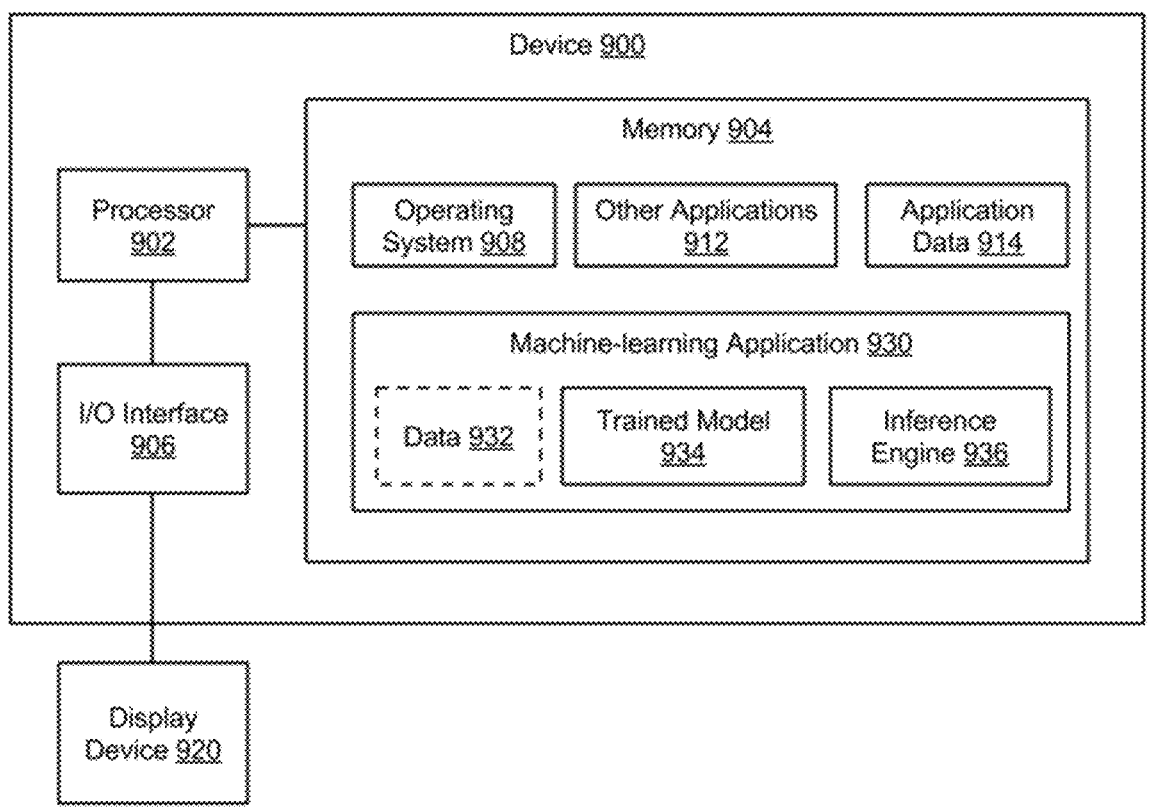
FIG. 9 is a block diagram of an example device which may be used for one or more implementations described herein.

FIG. 9 is a block diagram of an example device 900 which may be used to implement one or more features described herein. In one example, device 900 may be used to implement a client device, e.g., any of client devices 115 shown in FIG. 1. Alternatively, device 900 can implement a server device, e.g., server 101. In some implementations, device 900 may be used to implement a client device, a server device, or both client and server devices. Device 900 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, and input/output (I/O) interface 906. Processor 902 can be one or more processors and/or processing circuits to execute program code and control basic operations of the device 900. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 902 may include one or more co-processors that implement neural-network processing. In some implementations, processor 902 may be a processor that processes data to produce probabilistic output, e.g., the output produced by processor 902 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, machine-learning application 930, other applications 912, and application data 914. Other applications 912 may include applications such as a data display engine, web hosting engine, image display engine, notification engine, social networking engine, etc. In some implementations, the machine-learning application 930 and other applications 912 can each include instructions that enable processor 902 to perform functions described herein, e.g., some or all of the methods of FIGS. 2, 3, 4, and 7.

Other applications 912 can include, e.g., image editing applications, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application may utilize Bayesian classifiers, support vector machines, neural networks, or other learning techniques. In some implementations, machine-learning application 930 may include a trained model 934, an inference engine 936, and data 932. In some implementations, data 932 may include training data, e.g., data used to generate trained model 934. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 934, training data may include such user data. In implementations where users permit use of their respective user data, data 932 may include permitted data such as images (e.g., photos or other user-generated images), communications (e.g., e-mail; chat data such as text messages, voice, video, etc.), documents (e.g., spreadsheets, text documents, presentations, etc.)

In some implementations, data 932 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 930 excludes data 932. For example, in these implementations, the trained model 934 may be generated, e.g., on a different device, and be provided as part of machine-learning application 930. In various implementations, the trained model 934 may be provided as a data file that includes a model structure or form, and associated weights. Inference engine 936 may read the data file for trained model 934 and implement a neural network with node connectivity, layers, and weights based on the model structure or form specified in trained model 934.

Machine-learning application 930 also includes a trained model 934. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data 932 or application data 914. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, trained model 934 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a non-linear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 934 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 932, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine-learning application 930. In various implementations, a trained model includes a set of weights, or embeddings, corresponding to the model structure. In implementations where data 932 is omitted, machine-learning application 930 may include trained model 934 that is based on prior training, e.g., by a developer of the machine-learning application 930, by a third-party, etc. In some implementations, trained model 934 may include a set of weights that are fixed, e.g., downloaded from a server that provides the weights.

Machine-learning application 930 also includes an inference engine 936. Inference engine 936 is configured to apply the trained model 934 to data, such as application data 914, to provide an inference. In some implementations, inference engine 936 may include software code to be executed by processor 902. In some implementations, inference engine 936 may specify circuit configuration (e.g., for a programmable processor, for a field programmable gate array (FPGA), etc.) enabling processor 902 to apply the trained model. In some implementations, inference engine 936 may include software instructions, hardware instructions, or a combination. In some implementations, inference engine 936 may offer an application programming interface (API) that can be used by operating system 908 and/or other applications 912 to invoke inference engine 936, e.g., to apply trained model 934 to application data 914 to generate an inference.

Machine-learning application 930 may provide several technical advantages. For example, when trained model 934 is generated based on unsupervised learning, trained model 934 can be applied by inference engine 936 to produce knowledge representations (e.g., numeric representations) from input data, e.g., application data 914. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 936. In some implementations, knowledge representations generated by machine-learning application 930 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 930 may be implemented in an offline manner. In these implementations, trained model 934 may be generated in a first stage, and provided as part of machine-learning application 930. In some implementations, machine-learning application 930 may be implemented in an online manner. For example, in such implementations, an application that invokes machine-learning application 930 (e.g., operating system 908, one or more of other applications 912) may utilize an inference produced by machine-learning application 930, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 934, e.g., to update embeddings for trained model 934.

In some implementations, machine-learning application 930 may be implemented in a manner that can adapt to particular configuration of device 900 on which the machine-learning application 930 is executed. For example, machine-learning application 930 may determine a computational graph that utilizes available computational resources, e.g., processor 902. For example, if machine-learning application 930 is implemented as a distributed application on multiple devices, machine-learning application 930 may determine computations to be carried out on individual devices in a manner that optimizes computation. In another example, machine-learning application 930 may determine that processor 902 includes a GPU with a particular number of GPU cores (e.g., 1000) and implement the inference engine accordingly (e.g., as 1000 individual processes or threads).

In some implementations, machine-learning application 930 may implement an ensemble of trained models. For example, trained model 934 may include a plurality of trained models that are each applicable to same input data. In these implementations, machine-learning application 930 may choose a particular trained model, e.g., based on available computational resources, success rate with prior inferences, etc. In some implementations, machine-learning application 930 may execute inference engine 936 such that a plurality of trained models is applied. In these implementations, machine-learning application 930 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 908 or one or more applications 912.

In different implementations, machine-learning application 930 can produce different types of outputs. For example, machine-learning application 930 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response an input video, machine-learning application 930 may produce an output video with a particular effect applied, e.g., rendered in a comic-book or particular artist's style, when trained model 934 is trained using training data from the comic book or particular artist, etc. In some implementations, machine-learning application 930 may produce an output based on a format specified by an invoking application, e.g. operating system 908 or one or more applications 912. In some implementations, an invoking application may be another machine-learning application. For example, such configurations may be used in generative adversarial networks, where an invoking machine-learning application is trained using output from machine-learning application 930 and vice-versa.

Any of software in memory 904 can alternatively be stored on any other suitable storage location or computer-readable medium. In addition, memory 904 (and/or other connected storage device(s)) can store one or more messages, one or more taxonomies, electronic encyclopaedia, dictionaries, thesauruses, knowledge bases, message data, grammars, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. Interfaced devices can be included as part of the device 900 or can be separate and communicate with the device 900. For example, network communication devices, storage devices (e.g., memory and/or database 106), and input/output devices can communicate via I/O interface 906. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 906 can include one or more display devices 920 that can be used to display content, e.g., images, video, and/or a user interface of an output application as described herein. Display device 920 can be connected to device 900 via local connections (e.g., display bus) and/or via networked connections and can be any suitable display device. Display device 920 can include any suitable display device such as an LCD, LED, or plasma display screen, CRT, television, monitor, touchscreen, 3-D display screen, or other visual display device. For example, display device 920 can be a flat display screen provided on a mobile device, multiple display screens provided in a goggles or headset device, or a monitor screen for a computer device.

The I/O interface 906 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 9 shows one block for each of processor 902, memory 904, I/O interface 906, and software blocks 908, 912, and 930. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While some components are described as performing blocks and operations as described in some implementations herein, any suitable component or combination of components of environment 100, device 900, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method comprising:
    obtaining a plurality of images, wherein the plurality of images are available for display in a view of a device;
    programmatically analyzing the plurality of images by at least one processor to determine a plurality of image features;
    determining one or more image categories for the plurality of images based on the plurality of image features;
    identifying, by the at least one processor, a subset of the plurality of images based on the one or more image categories, wherein each image in the subset of the plurality of images is associated with an archive image category, wherein the archive image category designates images for archival;
    determining, by the at least one processor, whether one or more images in the subset of the plurality of images were captured more than a threshold period of time from a current time;
    in response to determining that the one or more images in the subset of the plurality of images were captured more than the threshold period of time from the current time, causing, by the at least one processor, a user interface to be displayed that includes the one or more images of the subset and a suggestion to archive the one or more images of the subset;
    receiving first user input to archive at least one image of the one or more images of the subset based on selection of the suggestion to archive by the first user input; and
    in response to the first user input, removing, by the at least one processor, the at least one image of the one or more images of the subset such that the at least one image is not available to be displayed in the view of the device after the removal.

2. The method of claim 1, wherein each image of the plurality of images includes archive metadata that indicates whether the image is included in the archive image category, and further comprising, in response to identifying the subset of the plurality of images, updating the archive metadata of each image of the subset to indicate that the image of the subset is in the archive image category.

3. The method of claim 1, further comprising:
storing image identifiers and the one or more image categories for the plurality of images in a database;
receiving second user input indicative of selection of a particular category of the one or more image categories; and
in response to receiving the second user input,
performing a database lookup to identify one or more images for the particular category based on the image identifiers and the one or more image categories; and
causing the one or more images for the particular category to be displayed.

4. The method of claim 1, wherein the archive image category includes one or more of document, meme, or screenshot.

5. The method of claim 4, wherein determining the one or more image categories comprises applying an image classifier trained to classify input images as one of: document, meme, or screenshot based on one or more of: metadata of the input images and pixel values of the input images, wherein the image classifier comprises a machine-learning application that is configured to recognize the plurality of image features from the input images and classify each input image based on the plurality of image features.

6. The method of claim 1, further comprising:
determining whether the subset of the plurality of images includes a count of images greater than a threshold,
wherein causing the user interface to be displayed is performed at a greater frequency in response to determining that the subset of the plurality of images includes the count of images greater than the threshold.

7. The method of claim 1, further comprising determining whether the subset of the plurality of images includes a count of images greater than a threshold,
wherein causing the user interface to be displayed is performed in response to determining that the subset of the plurality of images includes the count of images greater than the threshold in addition to determining that the one or more images in the subset of the plurality of images was captured more than the threshold period of time from the current time.

8. The method of claim 1 further comprising, in response to the first user input:
identifying an archive database; and
storing the at least one image of the one or more images in the archive database.

9. The method of claim 1 wherein identifying the subset of the plurality of images further includes:
determining whether multiple images of the plurality of images depict a particular scene;
determining whether an image editing operation has been performed via user input on one image of the multiple images; and
in response to determining that the multiple images depict the particular scene and that the image editing operation has been performed via user input on the one image of the multiple images, designating one or more images of the multiple images, exclusive of the one image, to be included in the subset of the plurality of images.

10. The method of claim 1 wherein the plurality of images are stored locally on a local storage of a user device, and wherein removing the at least one image comprises deleting the at least one image from the local storage.

11. A system comprising:
one or more hardware processors; and
a storage device with instructions stored thereon that, when executed by the one or more hardware processors, cause the one or more hardware processors to perform operations comprising:
obtaining a plurality of images, wherein the plurality of images are available for display in a view of a device;
programmatically analyzing the plurality of images to determine a plurality of image features;
determining one or more image categories for the plurality of images based on the plurality of image features;
identifying a subset of the plurality of images based on the one or more image categories, wherein each image in the subset of the plurality of images is associated with an archive image category, wherein the archive image category designates images for archival;
determining whether one or more images in the subset of the plurality of images were captured more than a threshold period of time from a current time;
in response to determining that the one or more images in the subset of the plurality of images were captured more than the threshold period of time from the current time, causing a user interface to be displayed that includes the one or more images of the subset and a suggestion to archive the one or more images of the subset;
receiving first user input to archive at least one of the one or more images of the subset based on selection of the suggestion to archive by the first user input; and
in response to the first user input, removing the at least one image of the one or more images of the subset such that the at least one image is not available to be displayed in the view of the device after the removal.

12. The system of claim 11, wherein each image of the plurality of images includes archive metadata that indicates whether the image is included in the archive image category, and the storage device having further instructions stored thereon that, when executed by the one or more hardware processors, cause the one or more hardware processors to perform operations comprising:
in response to identifying the subset of the plurality of images, updating the archive metadata of each image of the subset to indicate that the image of the subset is in the archive image category.

13. The system of claim 11, the storage device having further instructions stored thereon that, when executed by the one or more hardware processors, cause the one or more hardware processors to perform operations comprising:
storing image identifiers and the one or more image categories for the plurality of images in a database;
receiving second user input indicative of selection of a particular category of the one or more image categories; and
in response to receiving the second user input,
performing a database lookup to identify one or more images for the particular category based on the image identifiers and the one or more image categories; and causing the one or more images for the particular category to be displayed.

14. The system of claim 11, the storage device having further instructions stored thereon that, when executed by the one or more hardware processors, cause the one or more hardware processors to perform operations comprising:
determining whether the subset of the plurality of images includes a count of images greater than a threshold,
wherein the operation of causing the user interface to be displayed is performed at a greater frequency in response to determining that the subset of the plurality of images includes the count of images greater than the threshold.

15. The system of claim 11, wherein determining the one or more image categories comprises applying an image classifier trained to classify input images as one of: document, meme, or screenshot based on one or more of: metadata of the input images and pixel values of the input images.

16. The system of claim 11, the storage device having further instructions stored thereon that, when executed by the one or more hardware processors, cause the one or more hardware processors to perform operations comprising:
determining whether the subset of the plurality of images includes a count of images greater than a threshold,
wherein the operation of causing the user interface to be displayed is performed in response to determining that the subset of the plurality of images includes the count of images greater than the threshold in addition to determining that the one or more images in the subset of the plurality of images was captured more than the threshold period of time from the current time.

17. A non-transitory computer readable medium with instructions stored thereon that, when executed by a processor, cause the processor to perform operations comprising:
obtaining a plurality of images, wherein the plurality of images are available for display in a view of a device;
programmatically analyzing the plurality of images to determine a plurality of image features;
determining one or more image categories for the plurality of images based on the plurality of image features;
identifying a subset of the plurality of images based on the one or more image categories, wherein each image in the subset of the plurality of images is associated with an archive image category, wherein the archive image category designates images for archival;
determining whether one or more images in the subset of the plurality of images were captured more than a threshold period of time from a current time;
in response to determining that the one or more images in the subset of the plurality of images were captured more than the threshold period of time from the current time, causing a user interface to be displayed that includes the one or more images of the subset and a suggestion to archive the one or more images of the subset;
receiving first user input to archive at least one image of the one or more images of the subset based on selection of the suggestion to archive by the first user input; and
in response to the first user input, removing the at least one image of the one or more images of the subset such that the at least one image is not available to be displayed in the view of the device after the removal.

18. The non-transitory computer readable medium of claim 17, wherein each image of the plurality of images includes archive metadata that indicates whether the image is included in the archive image category, and the non-transitory computer readable medium having further instructions stored thereon that, when executed by a processor, cause the processor to perform operations comprising:
in response to identifying the subset of the plurality of images, updating the archive metadata of each image of the subset to indicate that the image of the subset is in the archive image category.

19. The non-transitory computer readable medium of claim 17, with further instructions stored thereon that, when executed by the processor, cause the processor to perform operations comprising:
determining whether the subset of the plurality of images includes a count of images greater than a threshold,
wherein causing the user interface to be displayed is performed at a greater frequency in response to determining that the subset of the plurality of images includes the count of images greater than the threshold.

20. The non-transitory computer readable medium of claim 19, with further instructions stored thereon that, when executed by the processor, cause the processor to perform operations comprising:
determining whether the subset of the plurality of images includes a count of images greater than a threshold,
wherein causing the user interface to be displayed is performed in response to determining that the subset of the plurality of images includes the count of images greater than the threshold in addition to determining that the one or more images in the subset of the plurality of images was captured more than the threshold period of time from the current time.

* * * * *